United States Patent
Knauft et al.

(10) Patent No.: US 11,182,261 B1
(45) Date of Patent: Nov. 23, 2021

(54) SYNCHRONIZING A STALE COMPONENT OF A DISTRIBUTED OBJECT USING MULTIPLE DELTA COMPONENTS DURING MAINTENANCE

(71) Applicant: VMware, Inc., Palo Alto, CA (US)

(72) Inventors: Eric Knauft, San Francisco, CA (US); Enning Xiang, San Jose, CA (US); Ojan Thornycroft, Los Altos, CA (US); Yiqi Xu, Redwood City, CA (US); Asit Desai, Palo Alto, CA (US); Varun Shah, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/106,050

(22) Filed: Nov. 27, 2020

(51) Int. Cl.
G06F 11/00 (2006.01)
G06F 11/16 (2006.01)
G06F 11/14 (2006.01)
G06F 11/20 (2006.01)
G06F 11/07 (2006.01)

(52) U.S. Cl.
CPC ...... *G06F 11/1658* (2013.01); *G06F 11/0772* (2013.01); *G06F 11/1435* (2013.01); *G06F 11/2056* (2013.01)

(58) Field of Classification Search
CPC ............ G06F 11/1435; G06F 11/1658; G06F 11/1662; G06F 11/2056; G06F 11/2082
See application file for complete search history.

(56) References Cited

U.S. PATENT DOCUMENTS

| 7,389,379 B1* | 6/2008 | Goel | G06F 11/1662 711/112 |
| 2020/0363958 A1* | 11/2020 | Mehra | G06F 11/3055 |

OTHER PUBLICATIONS

Odgers, Josh, "Nutanix Resiliency—Part 6—Write I/O during CVM maintenance or failures", Cloud XC, Jun. 8, 2018, 5 pages.
Unknown, "Consistent hashing", Wikipedia, https://en.wikipedia.org/wiki/Consistent_hashing, Aug. 13, 2020, 5 pages.

* cited by examiner

Primary Examiner — Michael Maskulinski

(57) ABSTRACT

The disclosure herein describes enhancing data durability of a base component using multiple delta components. A first and second delta component are generated based on the base component becoming unavailable. A write operation targeted for the base component is routed to the first delta component and to the second delta component. Based on routing the write operation targeted for the base component to the first delta component and to the second delta component, a bit associated with a data block affected by the write operation is changed in each of the tracking bitmaps of the first and second delta components. Based on detecting the base component becoming available, one delta component of the first and second delta components is selected, and the data block affected by the routed write operation is synchronized from the selected delta component to the base component. Later, the first and second delta components are removed.

20 Claims, 11 Drawing Sheets

SYNCHRONIZING A STALE COMPONENT OF A DISTRIBUTED OBJECT USING MULTIPLE DELTA COMPONENTS DURING MAINTENANCE

BACKGROUND

Distributed data objects can have multiple data components that are placed in different fault domains and/or on different servers. Sometimes, servers need to go into a maintenance mode, such that the components on the servers become unavailable. The data availability and durability of the distributed data object with which the unavailable components are associated is reduced when those components are unavailable. Further, when the servers exit maintenance mode and the components come back online, they may be stale due to missing some input/output traffic while unavailable. Further, some distributed data objects and/or associated systems may be more prone to suffer multiple failures and/or have requirements for multiple levels of redundancy to satisfy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure enhance data durability of a base component using a delta component at least by generating, by a processor, a first delta component on a first fault domain and a second delta component on a second fault domain based on the base component becoming unavailable, wherein each of the first delta component and the second delta component is configured to include unwritten storage space with an address space matching an address space of the base component and a tracking bitmap including a plurality of bits associated with data blocks of the address space of the delta component; routing, by the processor, a write operation targeted for the base component to the first delta component and to the second delta component; based on routing the write operation targeted for the base component to the first delta component and to the second delta component, changing, by the processor, a bit associated with a data block affected by the routed write operation in the tracking bitmap of the first delta component and changing a bit associated with the data block affected by the routed write operation in the tracking bitmap of the second delta component; based on detecting the base component becoming available, selecting, by the processor, one delta component of the first delta component and the second delta component for synchronization; synchronizing, by the processor, using the tracking bitmap of the selected delta component, the data block affected by the routed write operation from the selected delta component to the base component; and removing, by the processor, the first delta component and the second delta component.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 8, the systems are illustrated as schematic drawings. The drawings may not be to scale.

DETAILED DESCRIPTION

Figure 1:
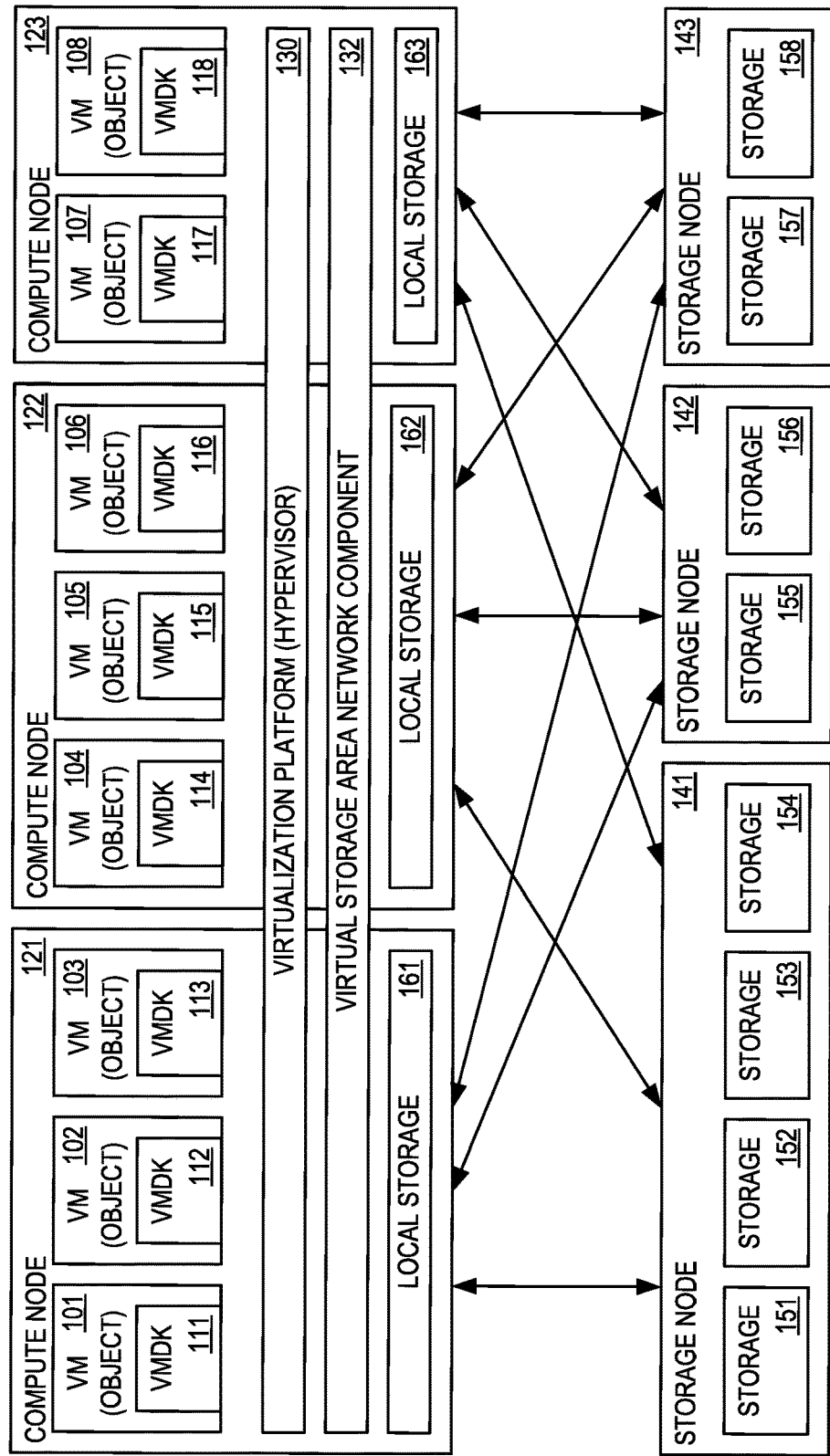
FIG. 1 is a block diagram illustrating a system architecture that is comprised of a set of compute nodes interconnected with each other and a set of storage nodes according to an embodiment.

Distributed data objects may be configured to store data spread out among multiple hardware devices and physical locations to both secure the data against loss due to hardware failure, software failure, or for other reasons (data durability) and to enable access to the stored data despite periodic downtimes for individual devices (data availability). Providing these features typically includes storing the data redundantly (e.g., storing the same data on multiple devices and/or in multiple locations) within data components of the distributed data object, such that, in the event that one server device fails, the data is still accessible on another server device that stores the data. For instance, data components of a distributed data object may include components configured to store subset of data associated with the distributed data object, such that the total data is stored across multiple components and/or components that mirror each other, such that the data of the distributed data object is stored redundantly on multiple components (e.g., the base components, mirrored components, and delta components described herein). When a component of the distributed data object is going to become unavailable, the data durability and availability will be reduced for the time period during which the component is unavailable and, when the component becomes available again, it may be in a stale state and require synchronization with an up-to-date component.

The described method and system enable the generation of multiple temporary delta components (e.g., two or more delta components for a base component) for use during downtime of conventional data components. The delta components are configured to temporarily track and mirror data changes that would have been performed in the unavailable component if it were available. Thus, the delta components provide enhanced data redundancy during the downtime of the component. Further, the delta components enable a more efficient method for bringing the associated component back up to date when it becomes available again and is in a stale state.

Aspects of the disclosure provide a computerized method and system for enhancing data durability of a base component using multiple delta components. A first delta component and a second delta component are generated based on the base component becoming unavailable. The delta components are configured to include unwritten storage spaces with address spaces matching the base component and tracking bitmaps associated with data blocks of the address spaces of the delta components. Write operations targeted for the base component are routed to both delta components. Based on the routed write, bits associated with data blocks affected by the write operations are changed in the tracking bitmaps. Based on the base component becoming available, one of the first and second delta components is selected for synchronization. Data blocks affected by routed write operations are identified based on the tracking bitmap of the selected delta component and the identified data blocks are synchronized from the selected delta component to the base component. The delta components are then removed.

The disclosure addresses the challenges, among others, of maintaining data durability and availability during and after downtime of data components of a distributed data object. Aspects of the disclosure provide sufficiently robust and flexible data availability and durability. The described methods and systems operate in an unconventional way by using multiple temporary delta components to track input/output (I/O) traffic and store associated data changes during the downtime of a component. The disclosure further enhances the durability and availability of stored data by providing for multiple delta components for a base component, which enables data to be maintained even in the event of failure of one of the delta components. Further, the synchronization, or resyncing, of the component when it becomes available again is made more efficient when using the delta components as synchronization sources instead of another mirrored component. For instance, less bandwidth and processing resources are required when synchronizing from a delta component because the unwritten sections of the delta component may be filtered out prior to synchronizing, enabling the synchronization process to avoid significant write amplification (e.g., when more data is written to the media than was sent for writing in the I/O writes). The use of multiple delta components further enhances the synchronization process by enabling the base component to be synchronized from more than one of the delta components, such that the synchronization process is protected in the event of failure of one of the delta components (e.g., the synchronization process may track progress when using a first delta component and, if the first delta component fails during the process, the process may then being using a second delta component, picking up from where the process left off with the first delta component).

The systems and methods described may be configured to make use of multiple delta components based on a failure to find a single fault domain which is not collocated with other sibling components. In this case, reusing a fault domain hosting a single component for a single delta component would not be acceptable because failure of that single fault domain would cause both the sibling component and the single delta component to fail. Such a failure would prevent the delta component from successfully compensating for the sibling component failure. In such cases, when multiple delta components (which may be collocated on fault domains with sibling components) are used as described herein, no single fault domain failure would cause both deltas to fail. This enables the disclosure to maintain the enhanced durability provided by delta components even though the deltas are collocated with sibling components. If a single delta is not a non-collocated fault domain and that fails, a sibling component may still be used to provide durability (as either a delta component or a sibling component can provide durability).

FIG. 1 is a block diagram illustrating a system architecture 100 that is comprised of a set of compute nodes 121-123 interconnected with each other and a set of storage nodes 141-143 according to an embodiment. In other examples, a different number of compute nodes and storage nodes may be used. Each compute node hosts multiple objects, which may be virtual machines (VMs), containers, applications, or any compute entity that can consume storage. When objects are created, they are designated as global or local, and the designation is stored in an attribute. For example, compute node 121 hosts objects 101, 102, and 103; compute node 122 hosts objects 104, 105, and 106; and compute node 123 hosts objects 107 and 108. Some of objects 101-108 are local objects. In some examples, a single compute node may host 50, 100, or a different number of objects. Each object uses a virtual machine disk (VMDK), for example VMDKs 111-118 for each of objects 101-108, respectively. Other implementations using different formats are also possible. A virtualization platform 130, which includes hypervisor functionality at one or more of computer nodes 121, 122, and 123, manages objects 101-108.

In some examples, various components of architecture 100, for example compute nodes 121, 122, and 123, and storage nodes 141, 142, and 143 are implemented using one or more computing apparatuses 1018 of FIG. 10.

Virtualization software that provides software-defined storage (SDS), by pooling storage nodes across a cluster, creates a distributed, shared data store, for example a storage area network (SAN). In some distributed arrangements, servers are distinguished as compute nodes (e.g., compute nodes 121, 122, and 123) and storage nodes (e.g., storage nodes 141, 142, and 143). Alternatively, or additionally, some arrangements include servers and/or other nodes that act as both compute nodes and storage nodes. Such an arrangement may be referred to as a hyperconverged infrastructure. Although a storage node may attach a large number of storage devices (e.g., flash, solid state drives (SSDs), non-volatile memory express (NVMe), Persistent Memory (PMEM)) processing power may be limited beyond the ability to handle input/output (I/O) traffic. During data writes to storage devices, a phenomenon termed write amplification may occur, in which more data is written to the physical media than was sent for writing in the I/O. Write amplification is an inefficiency that produces unfavorable I/O delays and may arise as a result of synchronization between mirrored components to bring a stale component up to date, as described herein.

Storage nodes 141-143 each include multiple physical storage components, which may include flash, solid state drives (SSDs), non-volatile memory express (NVMe), persistent memory (PMEM), and quad-level cell (QLC) storage solutions. For example, storage node 141 has storage 151, 152, 152, and 154; storage node 142 has storage 155 and 156; and storage node 143 has storage 157 and 158. In some examples a single storage node may include a different number of physical storage components. In the described examples, storage nodes 141-143 are treated as a SAN with a single global object, enabling any of objects 101-108 to write to and read from any of storage 151-158 using a virtual SAN component 132. Virtual SAN component 132 executes in compute nodes 121-123.

Thin-provisioning may be used, and in some examples, storage nodes 141-143 do not require significantly more processing power than is needed for handling I/O traffic. This arrangement may be less expensive than in an alternative embodiment in which all of storage nodes 141-143 have the same or similar processing capability as compute node 121. Using the disclosure, compute nodes 121-123 are able to operate with a wide range of storage options, including those with minimal processing capability.

In some examples, compute nodes 121-123 each include a manifestation of virtualization platform 130 and virtual SAN component 132. Virtualization platform 130 manages the generating, operations, and clean-up of objects 101 and 102, including the moving of object 101 from compute node 121 to another compute node, to become a moved object. Virtual SAN component 132 permits objects 101 and 102 to write incoming data from object 101 and incoming data from object 102 to storage nodes 141, 142, and/or 143, in part, by virtualizing the physical storage components of the storage nodes.

Figure 2:
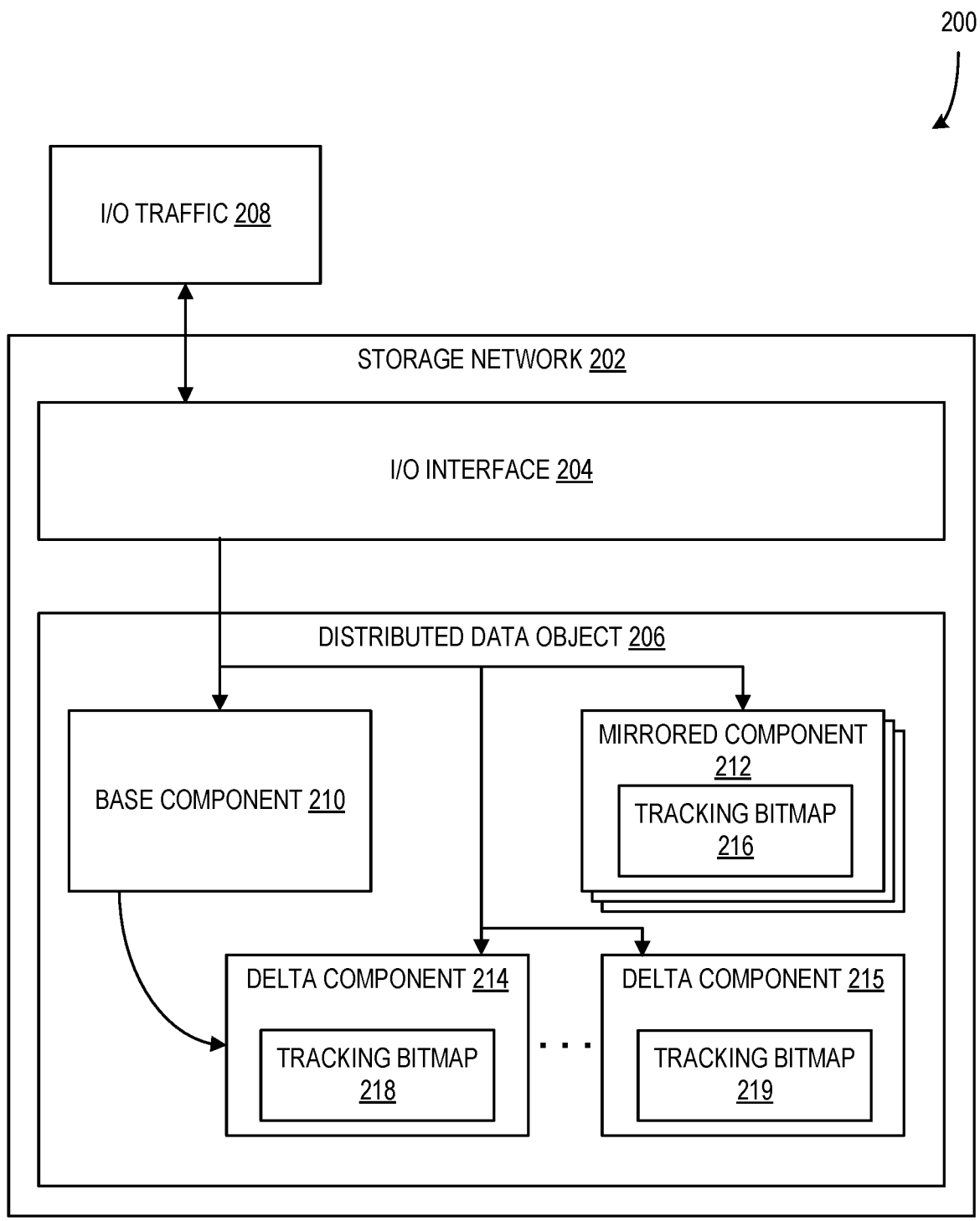
FIG. 2 is a block diagram illustrating a system configured for generation and management of delta components associated with components of a distributed data object according to an embodiment.

FIG. 2 is a block diagram illustrating a system 200 configured for generation and management of delta components 214-215 associated with data components (e.g., base component 210 and mirrored components 212) of a distributed data object 206 according to an embodiment. In some examples, the system 200 is implemented on a component or components of a system architecture such as system architecture 100 of FIG. 1. For instance, in some examples, the storage network 202 is implemented as a virtual storage network component or virtual SAN component 132 of FIG. 1 as described above.

The storage network 202 includes an I/O interface 204 and a distributed data object 206 and is configured to receive and/or otherwise interact with I/O traffic 208, including I/O messages or instructions for writing data to the distributed data object 206. In other examples, the storage network 202 may include more and/or differently arranged distributed data objects and/or another data storage object or structure without departing from the description. The I/O interface 204 includes hardware, firmware, and/or software configured for receiving I/O traffic 208 from sources outside the storage network 202 and writing or otherwise sending the associated I/O instructions to the distributed data object 206 of the storage network 202. In many examples, the I/O traffic 208 includes instructions to write data to the storage component or components of the distributed data object 206 for storage therein. Additionally, the I/O interface 204 may be configured for retrieving stored data from the distributed data object 206 and provide such retrieved data to sources outside of the storage network 202. Further, the I/O interface 204 may be configured for facilitating communication of data between multiple distributed data objects or other components within the storage network 202 without departing from the description.

The distributed data object 206 is configured to store data across a plurality of data components (data structures configured to store at least a portion of the total data associated with the distributed data object 206), such as the base component 210, the mirrored components 212, and the delta components 214-215. In some examples, the distributed data object 206 stores data redundantly across multiple components. For instance, multiple copies of a set of data may be stored on each of the base component 210 and the mirrored components 212, such that the data is preserved in the event that one or some of the components fail. The distributed data object 206 may be configured to provide enhanced reliability and availability of the stored data through the redundant storage of data on the multiple components, enabling the data to be accessed despite failure or unavailability of individual components.

It should be understood that, while the base component 210 is illustrated separately from the other mirrored components 212, in other examples, the base component 210 is effectively identical to the other mirrored components 212. Further, the described functionality of the delta components 214-215 herein may also apply to components of the distributed data object 206 other than the base component 210 in other examples. For instance, one or more delta components may be generated and used as described herein with respect to the mirrored component 212 such that the mirrored component 212 operates as a base component as described herein.

In some examples, components (e.g., the base component 210) of the distributed data object 206 are configured to have downtime for maintenance or other reasons (e.g., the base component 210 and/or a host device associated therewith may enter a maintenance mode). Because of the previously described redundancy, the distributed data object 206 is typically capable of continuing to provide access to stored data and to receive additional I/O traffic to write data on the mirrored components 212 that remain active. Further, the distributed data object 206 and/or the associated storage network 202 are configured to enhance the reliability and availability of data storage by creating a delta component 214 or multiple delta components 214-215 when the base component 210 is preparing to become deactivated or otherwise go offline. The delta components 214-215 are configured as temporary components that are configured to log or otherwise track I/O traffic and associated data changes that would be directed to the base component 210 if it were not offline. Further, when the base component 210 becomes reactivated, the delta components 214-215 are configured to synchronize logged or tracked I/O traffic with the reactivated component such that the base component 210 is brought up-to-date with respect to I/O traffic that occurred during the period in which it was inactive. The use of the delta components 21-215 as described provides additional redundancy and reliability of the distributed data object during the downtime of the base component 210.

Further, the number or quantity of created delta components may be one delta component 214, two delta components 214 and 215, or more. The number of created delta components may be determined by the distributed data object 206 or otherwise by the system 200 based on the fault tolerance requirements (e.g., failure to tolerate (FTT)) of the distributed data object 206 or of the storage network 202 (e.g., a particular distributed data object 206 may require that two, three, or four failures within the object be tolerated without adverse effects on the stored data and, as a result, the number of delta components created may increase with such a requirement). Alternatively, or additionally, the number of delta components 214-215 created in the distributed data object 206 may be based on limitations of the distributed data object 206 or the storage network 202 in general. For instance, if there are a limited number of fault domains upon which delta components may be placed, a limited amount of space upon which delta components may be placed, and/or a limited number of components that may be placed in fault domains, that may result in the number of created delta components being limited (e.g., if there is only one fault domain that can store a delta component based on defined delta component placement rules, then only one delta component 214 may be created with respect to the base component 210 as described herein). Alternatively or in addition, in other examples, additional fault domains are created.

In some examples, when a host device or entity is transitioned into a maintenance mode, the components of the host become inaccessible and the availability of the data on the associated distributed data object 206 is reduced or weakened, such that the object is able to tolerate fewer fault domain failures (e.g., the FTT) value of the data object 206 is reduced). Further, the components become "stale" due to potentially missing out on I/O traffic during the downtime. Stale components (e.g., the base component 210) keep the stale state until they synchronize with an active mirrored component or delta component. If there is no available component for synchronizing, stale objects are never able to restore data availability. For example, if the host of the base component 210 enters a maintenance mode for a period of time and the base component 210 is unavailable during incoming I/O traffic 208, when the base component 210 is reactivated, it is considered "stale", in that it has not been updated to include the incoming I/O traffic 208 that occurred during the downtime. If at least one of the delta components 214-215 is not generated and operated as described herein and there are no mirrored components 212 that are active and available for synchronizing, the base component 210 and the associated distributed data object 206 will lose data availability forever.

Rather, prior to the base component 210 becoming inactive for maintenance, the delta component(s) 214-215 are generated to track incoming I/O traffic 208 during the downtime and to provide a source for synchronizing when the base component 210 is reactivated. In some examples, the incoming I/O traffic 208 is also written to the mirrored components 212, but the delta components 214-215 provide additional resources for protecting the availability of the data during the downtime by providing "eventual data availability" (e.g., other mirrored components 212 may experience failure or inactivity during the downtime or otherwise prior to the base component 210 synchronizing to come back up-to-date).

The delta components 214-215 are configured to store the latest data of the data blocks affected by the I/O traffic 208 that is not captured by the deactivated base component 210. The base component 210 can then be brought up to date by synchronizing with at least one of the delta components 214-215 before the delta components 214-215 are later deleted or otherwise removed.

In some examples, the delta components 214-215 are not full copies of the base component 210. Instead, the delta components 214-215 are configured to have the address space of the base component 210, but the data locations are unwritten, rather than written with copied data from the base component 210. As a result, the delta components 214-215 do not alone provide full data availability as might be provided by an active mirrored component 212. However, because the delta components 214-215 track incoming I/O during the inactive period of the base component 210, the delta components 214-215 do enable full data availability to be eventually provided by the base component 210 after synchronizing. Thus, the delta components 214-215 provide "eventual data availability".

A typical reason for a component to be deactivated is a maintenance mode of the associated host device, during which software may be upgraded on the host device. Such a process may cause a component to be inactive for up to an hour, for example. The delta components 214-215 are configured to be capable of tracking all I/O traffic 208 intended for the base component 210 during that time. If all other mirrored components 212 fail or otherwise become inactive during that time, the delta components 214-215 provide additional resources for protecting the availability of the data of the distributed data object 206.

The mirrored components 212 and delta components 214-215 are configured to include tracking bitmaps 216 and tracking bitmaps 218 and 219, respectively. The tracking bitmaps 216, 218, and 219 are used by the associated components to track data blocks that are changed due to incoming I/O traffic 208 during downtime of the base component 210. By tracking which data blocks are changed during the downtime, the base component 210 can be brought up to date by synchronizing only those changed data blocks as indicated in the tracking bitmaps 216, 218, and 219. In some examples, the tracking bitmaps 216, 218, and 219 are configured to include a plurality of data bits with each data bit mapping to an individual data region or block within the address space of the component (e.g., a single bit may map to a 2 MB data region of the address space of the component). The data bits of the tracking bitmap may be initialized to '0' and, upon incoming I/O traffic 208 causing data in a data block to change, the associated component updates the mapped data bit of the data block to be a '1', indicating that that data block will need to be provided to the base component 210 in order to bring it up-to-date, once the base component 210 is available again. The use of tracking bitmaps 216, 218, and 219 are described in greater detail below with respect to FIG. 4A.

Because delta components, such as delta components 214-215, do not need to have the historical written I/O of the object before creation or generation, they become active directly without going through any synchronization procedure after being created. Delta components have three major states (the persistent state and the memory state of these three are the same). Once created successfully, a delta component will go to an active state. If the delta component is disconnected from the owning distributed data object, it transitions into an absent state. In some examples, a system management program is configured to immediately mark the absent component as a degraded component to mark it for removal by an associated cleanup process. In some examples, it may take more than an hour for the cleanup process to clean up an absent component. However, it is not necessary to leave an inactive delta component or components to wait for such a time window, because once the base component is synchronized, the purpose of the delta component(s) is completed and the component(s) will become stale if/when new I/O traffic is committed to another active mirrored component. To avoid letting a degraded delta component (e.g., delta component 214) wait for removal and occupy system resources while waiting, the degraded delta component may be deleted quickly by moving it to the degraded state and notifying the cleanup process to delete it as soon as possible. In alternative examples, a degraded delta component may be promoted back to active if it has not become stale and its disk is healthy.

Figure 3:
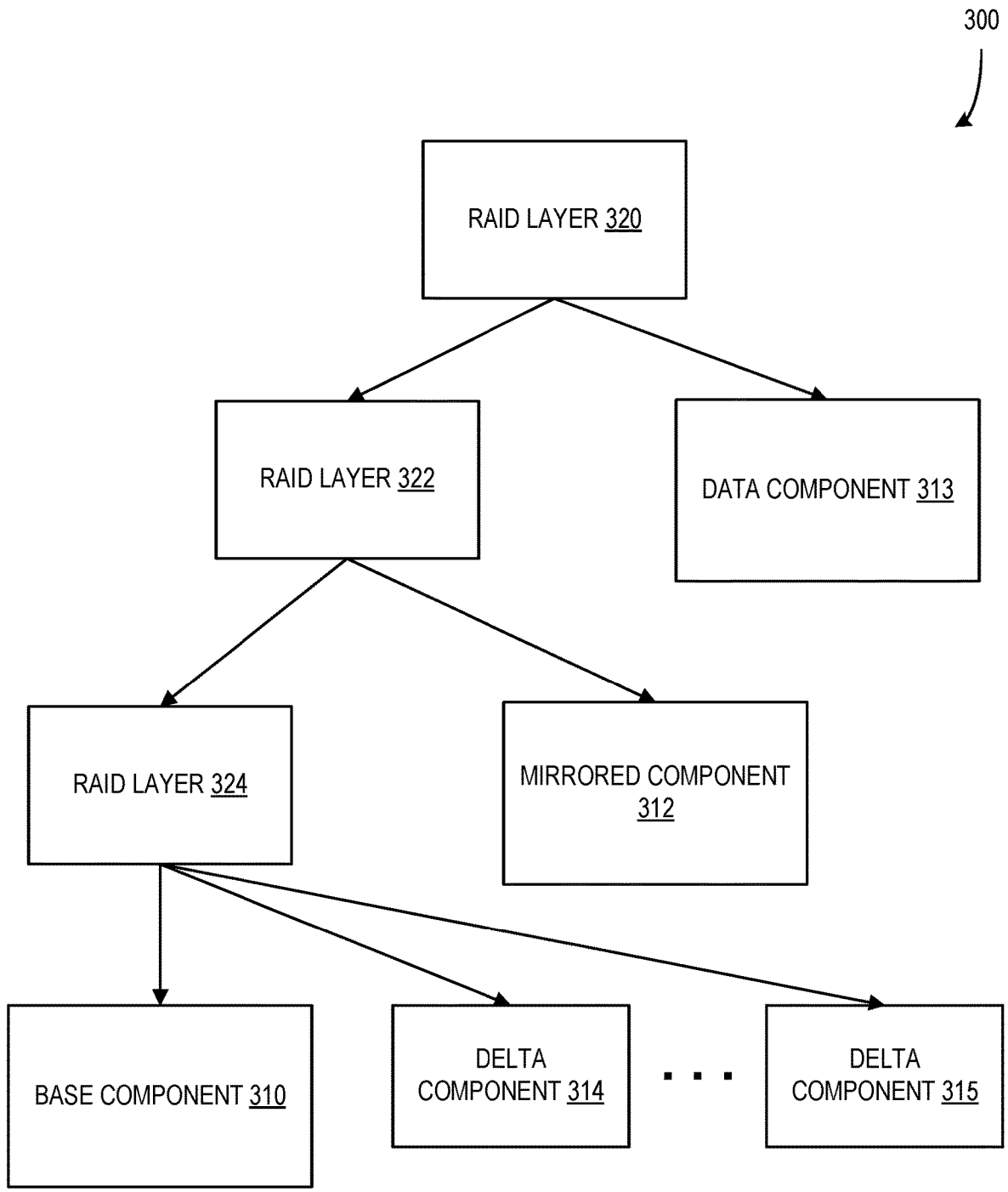
FIG. 3 is a block diagram illustrating a system configured with a redundant array of independent disks (RAID) for use with delta components according to an embodiment.

FIG. 3 is a block diagram illustrating a system 300 configured with a redundant array of independent disks (RAID) (e.g., RAID layers 320, 322, and 324) for use with delta components (e.g., delta components 314 and 315) according to an embodiment. In some examples, the system 300 is implemented by a component or components of a system such as system 100 of FIG. 1 and/or system 200 of FIG. 2 (e.g., the distributed data object 206 may include the RAID system 300). It should be understood that the RAID layers 320 and 322 may include layers configured for mirroring (e.g., RAID 1) the associated components (e.g., mirroring the mirrored component 312 and the components associated with the RAID layer 324). Additionally, or alternatively, the RAID layers 320 and 322 may include layers configured for "striping" (e.g., RAID 0), such that the components associated with such a layer share data storage associated with incoming I/O traffic. For instance, if RAID layer 320 is configured as a RAID 0 layer, data stored may be split between the component 313 and the components associated with RAID layer 322. The RAID layers 320 and 322 may be configured to combine both types, such that RAID layer 320 is configured for striping and RAID layer 322 is configured for mirroring (e.g., RAID 01), or vice versa (e.g., RAID 10). Further, the RAID layers 320, 322, and/or 324 may be configured with other RAID features or functionality without departing from the description herein (e.g., error correction of a RAID 2 configuration or various parity features of RAID 3, 4, 5, and/or 6 configurations). Additionally, or alternatively, the RAID layers may be configured with erasure coding (e.g., RAID 5 or 6 configurations) without departing from the spirit of the disclosure. In some examples, double delta components as described herein are used in a RAID tree configuration, such that the delta components provide extra protection for the "leaf" of the original tree, and are unaware of the types of the nodes above them in the tree configuration. In most cases, delta components are configured as components that mirror the base component, such that delta components may be not usable in configurations where all data remains on a single component.

In order to enable the functionality of the delta component 314 as described herein, in some examples, the RAID layer 324 is configured for mirroring I/O traffic intended for the base component 310 between the base component 310 and the delta components 314-315. Thus, the configuration of the RAID layer 324 may be configured for mirroring independently from the overall arrangement of the RAID system 300. It should further be understood that, in other examples, the RAID system 300 may be organized in other arrangements and/or include more, fewer, or different RAID layers and associated components without departing from the description herein.

In some examples, the components "vote" when determining whether to commit or abort an I/O write to the associated distributed data object. The components vote to commit if they are in a state in which they can commit the I/O write. If the components as a group submit a threshold quantity of votes to commit the data (e.g., the threshold quantity may be equal to the quantity of active components for the I/O range of the I/O write to be committed), the data is committed to the distributed data object and the associated components. Alternatively, if the components do not submit a threshold quantity of votes to commit (e.g., several of the components are in an unavailable or failed state), the I/O write command is aborted for the distributed data object. As a result of aborting the command, a notification or alert may be sent to the source of the I/O write. In some examples, the voting process is handled according to a two-phase commit (2PC) configuration. The delta components as described herein have the same vote weight in such a process to decide whether I/O should be committed or aborted. Further, the algorithm to handle 2PC I/O failure recovery on the delta component will be the same as that for the mirrored components under a RAID 1 or RAID erasure coding (EC) configuration. All relevant active delta components' votes are counted when calculating the "needed count" and "actual count" for an inflight I/O.

Further, it should be understood that, in configurations using RAID EC where conventional mirrored components of an object do not necessarily have the exact same data stored due to such a configuration, the use of the delta components to synchronize with the base component as described herein is a substantial improvement over synchronizing with the other mirrored components, as synchronizing with the other mirrored components requires a reconstruction of data from each component to obtain the data needed to write to the synchronizing base component.

Figure 4A:
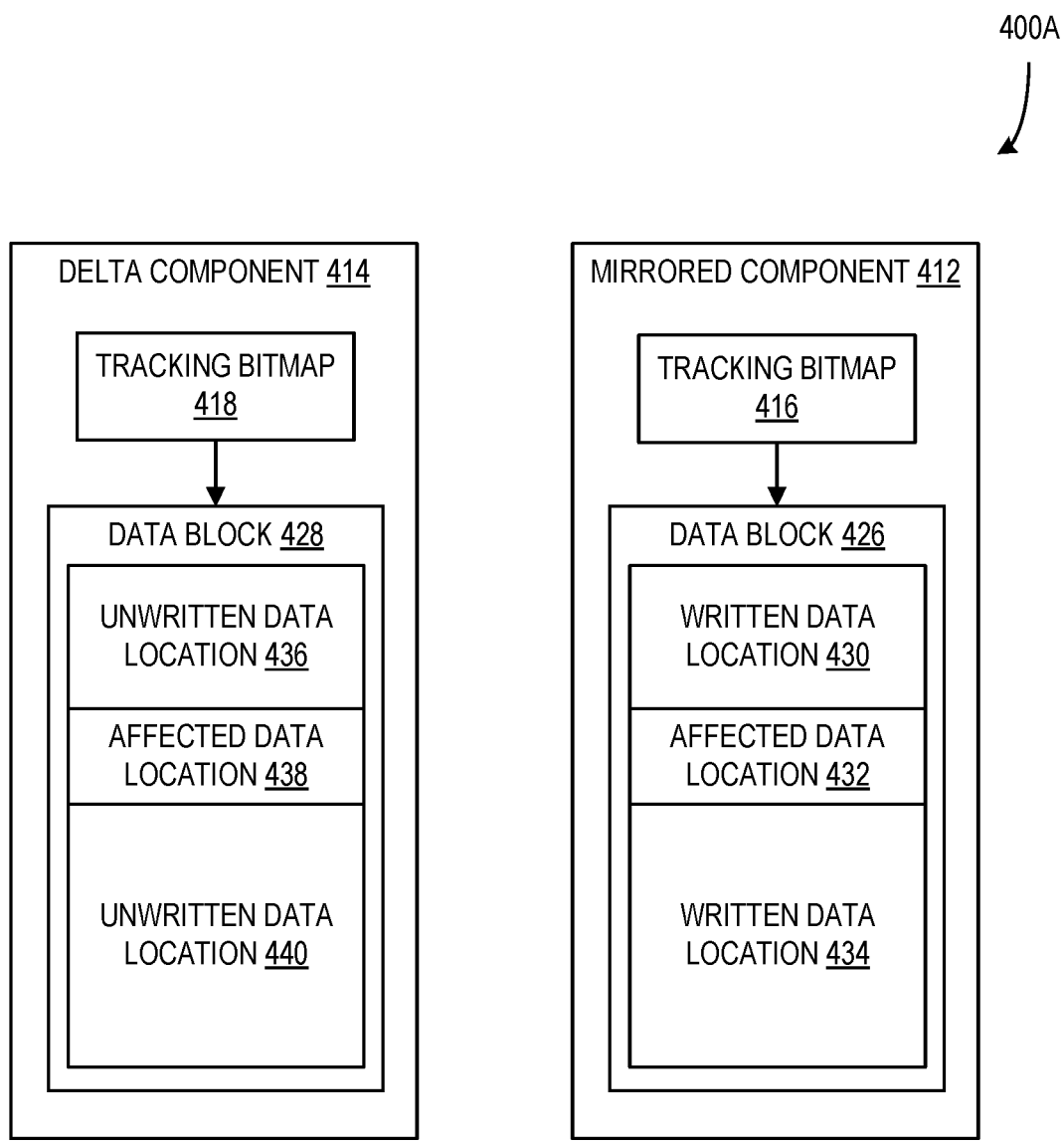
FIG. 4A is a block diagram illustrating tracking bitmaps of a delta component and a mirrored component and associated data blocks according to an embodiment.

FIG. 4A is a block diagram 400 illustrating tracking bitmaps 418 and 416 of a delta component 414 and a mirrored component 412 and associated data blocks 428 and 426 according to an embodiment. In some examples, the delta component 414 and the mirrored component 412 are included in a system such as system 200 of FIG. 2 as described herein. Further, it should be understood that the delta component 414 and the mirrored component 412 are configured to mirror the same component (e.g., base component 210) during a period when the component being mirrored is inactive, such that the tracking bitmaps 418 and 416 are used to track incoming I/O traffic for use in synchronizing with the component when it is reactivated. Additionally, the delta component 414 may be one of a plurality of delta components configured to mirror the base component as described herein (e.g., delta components 214-215 of FIG. 2). In such examples, each delta component of the plurality of delta components may be configured to operate in substantially the same manner and to store substantially the same data during operation.

The tracking bitmaps 418 and 416 each include references to data blocks 428 and 426, respectively. As previously described, the tracking bitmaps include bits that are associated with specific data blocks of storage space and those bits are changed in the tracking bitmaps when the associated data blocks are changed due to incoming I/O. As illustrated, the data blocks 428 and 426 are data blocks that include "affected" data locations 438 and 432 respectively, which are data locations that have been changed due to incoming I/O during the downtime of the component that is being mirrored. The data of the affected data locations 438 and 432 will need to be provided to the inactive component in order to bring it up to date after the downtime is over. Because both the delta component 414 and the mirrored component 412 are configured to mirror the inactive component, the data written to the affected data locations 438 and 432 is substantially identical.

However, the delta component 414 is not an exact copy of the inactive component or the mirrored component 412 and, as a result, the data locations (e.g., data regions associated with bits in the tracking bitmap) of the delta component 414 comprise primarily unwritten data locations. For instance, the data block 428 includes unwritten data locations 436 and 440 in addition to the affected data location 438. In some examples, the unwritten data locations 436 and 440 are identifiable as "unwritten" in that they have been initialized (e.g., set to '0') or otherwise assigned values indicating the locations are unwritten. Alternatively, or additionally, the delta component may provide allocation metadata that indicates which data regions or blocks are written and/or which are unwritten. Such allocation metadata may be based on data regions associated with the bits of the tracking bitmap or the metadata may indicate written and/or unwritten data on a more granular level (e.g., the metadata may be configured to indicate written and/or unwritten data in the delta component in 4 KB regions or blocks of address space). In examples where such metadata is more granular than bits of the tracking bitmap, the metadata may further be used during synchronization to identify written regions that are to be synchronized, such that tracking bits of the tracking bitmap are used first to identify associated data regions with changes and then the more granular allocation metadata is used within those data regions to identify specific locations that have been changed. By comparison, the mirrored component 412 is a full copy of the inactive component that is configured to mirror all of the data locations of the inactive component such that the data block 426 includes the affected data location 432 and also written data locations 430 and 434. The data block 426, and potentially many other data blocks of the mirrored component 412, include data written to the mirrored component 412 prior to the downtime of the inactive component and, as a result, the data block 426 may already be populated with data when the mirrored component 412 begins tracking I/O traffic during the downtime of the inactive component.

As a result of this difference, when bringing the inactive base component back up to date by synchronizing, using the delta component 414 substantially reduces the occurrence of write amplification when copying affected data of data blocks to the recently activated base component when compared with the synchronization process using the mirrored component 412, in some examples. For instance, because the data block 428 includes substantial unwritten sections, the synchronization process is able to identify the affected data location 438 specifically and limit the copying of data to just the affected data location 438 rather than copying the entire data block 428. Alternatively, because the data block 426 of the mirrored component 412 includes both the affected data location 432 and other written data locations 430 and 434, the system is not capable of identifying which locations of the data block 426 need to be copied. As a result, synchronizing the base component with the mirrored component 412 requires the copying of the entire data block 426 to ensure that the base component is brought up to date. Thus, the written data locations 430 and 434 of the data block 426 must be copied to the equivalent locations within the base component, even though those equivalent locations already contain the written data, causing write amplification.

The process of synchronizing a base component with a delta component 414 includes the four operations: estimating the synchronization workload using the tracking bitmap, reconciling the base component (e.g., resolving unresolved I/O), filtering out unwritten portions of the workload, and copying the data of the workload. In examples where the delta component 414 is present, there are two types of sources for three of the above four operations to synchronize the base component: the mirrored component 412 and the delta component 414. There are several possible ways to make use of the two types of synchronization sources. A few of these ways are next described.

First, the system may be configured to only use regular mirror components. This is the same process as synchronizing a base component when a delta component 414 is not present. The performance of such a process remains the same as that of a typical synchronization without a delta component 414, and the delta component 414 is only used when the distributed data object (e.g., the mirrored components 412) does not otherwise have data availability. The drawback is that the process does not take advantage of the delta component 414 to get the best performance as described herein.

Second, the system may be configured to use mixed mirror sources (e.g., the mirrored component 412 and the delta component 414. In this approach, the synchronization engine can pick up any sources (including regular mirrored components and delta components) for relevant operations as long as they are available, and the synchronization workflow will continue so long as at least one source remains available. This process may give the best performance, but it must be configured to handle mismatches when synchronization sources are mixed. The process can always use the delta component 414 to get written data blocks and data locations and read data by default, but if the delta component 414 becomes unavailable, the process must track the type of synchronization source used up to that point and ensure that the correct data is copied from the synchronization source, in this example. For instance, if using the delta component 414, the unwritten data locations may be filtered out prior to copying as described herein, but if the process must switch to using a mirrored component 412 prior to completion of the synchronization, the process must also change to fully copying the affected data blocks of the mirrored component 412 to complete the synchronization process. Additionally, this process presents challenges with respect to managing issues that may be related to either the delta components or the mirrored components. In examples where there are multiple delta components that have been used to mirror the base object, using the mixed mirror source approach may include switching from one delta component that becomes unavailable to a second delta component. In such cases, both delta components should be substantially identical, such that the technique of filtering out unwritten data locations when copying to the base component may still be used with the second delta component after the switch is made. In some examples, the delta component indicates a shorter history of changes to data blocks than as indicated by the regular mirror component. Additionally, or alternatively, switching from a mirror component to a delta component may be done, but determining data to be synchronized must be done carefully to avoid copying unwritten regions of the delta component based on using allocation information from the mirror component, which may not have the same unwritten regions. Explicit checking operations may be performed to avoid mixing the allocation information and data sources between delta components and mirror components.

Third, the system may be configured to use a fixed mirror source for each synchronization process and to prioritize the use of delta components 414 if they are available. In this configuration, if the source of the synchronization process becomes unavailable during the process, the system is configured to restart the process using another available source rather than attempting to continue the process with a different source. In most cases, this configuration takes advantage of the described advantages of the delta component 414 due to prioritizing it over other mirrored components 412. In some situations, when the delta component 414 becomes unavailable prior to completion of the synchronization, the process may be restarted using a mirrored component 412, which substantially increases the time and resource cost of the process. However, because the delta component 414 is quickly removed from the system once it becomes unavailable, the process will only ever need to switch between types of synchronization sources once during a process, as only mirrored components 412 will remain as available synchronization sources. Alternatively, if there are multiple delta components as described herein, this third technique may also include switching from one delta component to another delta component when the first delta component becomes unavailable. Such a configuration prioritizes the use of all available delta components before switching to a mirrored component 412 in order to prioritize the advantages provided by the delta components. In switching to another delta component, the system may be configured to either start the synchronization process over as described above when switching to a mirrored component 412, or the synchronization process may be continued with another available delta component from where it left off with the previous delta component.

Figure 4B:
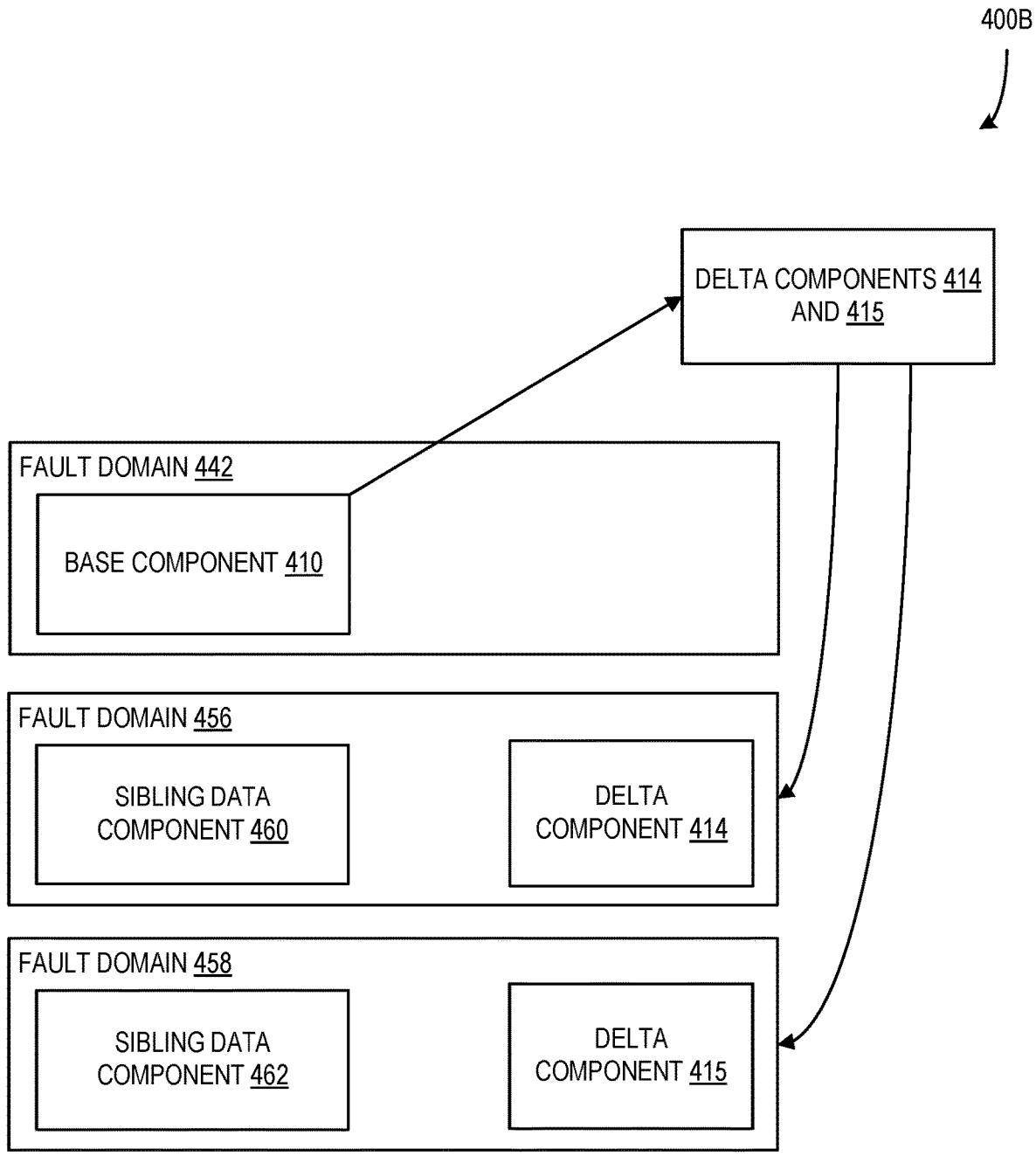
FIG. 4B is a block diagram illustrating the placement of two delta components on two fault domains of a system according to an embodiment.

FIG. 4B is a block diagram 400B illustrating the placement of two delta components 414 and 415 on two fault domains 456 and 458 of a system according to an embodiment. In some examples, if a single delta component 414 cannot be placed on a fault domain where it is not collocated with a sibling data component, the two delta components 414 and 415 (e.g., double delta components or otherwise "nonexclusive" delta components) may be placed as described with respect to diagram 400B. The illustrated components of a system of diagram 400B may be implemented as components of a system such as system 100 of FIG. 1 and/or system 200 of FIG. 2. For instance, the base component 410, the sibling components 460 and 462, and the delta components 414 and 415 may be part of a distributed data object (e.g., distributed data object 206) that is distributed across a plurality of hardware host devices (e.g., multiple servers and/or racks of servers in a data center).

In addition to the fault domain 442, the system further includes fault domains 456 and 458 that include sibling data components 460 and 462 in diagram 400B. In other examples, the system illustrated in 400B may include more, fewer, or different fault domains including differently arranged components without departing from the description herein.

In some examples, when the base component 410 has an upcoming downtime (e.g., for host maintenance) and the delta components 414 and 415 are created as a single delta component to act as temporary mirror components as described herein with respect to diagram 400B. Because the delta component 414 is complementary to the base component 410 and the downtime of the base component 410 is often caused by host maintenance downtime, the delta component 414 (and the delta component 415 when they are created as double delta components as described with respect to diagram 400B) cannot be placed on the same fault domain (e.g., fault domain 442) as the base component 410. If it were placed on fault domain 442, the delta component 414 would become unavailable along with the base component 410 during host maintenance, invalidating the purpose of the delta component 414. Further, the delta component 414 and the delta component 415 are configured to provide additional security against loss of data availability of the distributed data object during the downtime of the base component 410, so any fault domain (e.g., fault domain 444) that already includes mirrored component (e.g., mirrored component 412) of the base component 410 should also be avoided.

The system illustrated in diagram 400B may attempt to identify a fault domain on which to place the delta component 414 as a single delta component from a set of possible fault domains that does not include the fault domain of the base component 410 or a fault domain that includes mirrored components 412 of the base component 410. If no single delta component fault domain options are available, the system may be configured to place double delta components 414 and 415 as described with respect to 400B. It should be understood that the use of double delta components (or larger quantities of delta components) may be prioritized before or after any single delta component options and/or use of double delta components may replace any single delta component option without departing from the description.

Double delta components may be placed on fault domains (e.g., fault domains 456 and 458) that already contain sibling data components (e.g., sibling data components 460 and 462), which are part of the same data object as the base component 410 but are not full mirrors of the base component 410 and/or of each other. If the sibling components are each full mirrors, then delta components are not needed since the data object can tolerate the failure of one of the fault domains and still have an active full mirror. In some examples, the sibling data components may be configured to form a full sibling mirror of the base component 410 when combined. For instance, in a RAID-EC or RAID5(3+1) configuration where three components together make up a "sibling mirror" of a base component, to synchronize the base component, at least two of the three components must be active in addition to one delta component (a total of three components). In such examples, placing two delta components on separate fault domains ensure that failure of one of the fault domains can be tolerated and one delta component will survive such a failure. It is undesirable to place a single, or "exclusive", delta component on a fault domain with a sibling data component because failure of such a fault domain would result in the loss of both the sibling data component and the single delta component, preventing the base component and the associated data object from recovering. However, placing multiple delta components, such as the double delta components 414 and 415, on multiple fault domains 456 and 458 that already contain sibling data components 460 and 462 may provide sufficient enhancement of the durability of the data of the data object, as failure of one of the two fault domains leaves the other fault domain with a sibling data component and delta component that can be used to recover. In some examples, the only constraint on placing two or more nonexclusive delta components is that they cannot be placed such that they co-locate with each other or with the base component they are intended to protect.

For example, in a RAID5 object with a four-node cluster, two double delta components, or nonexclusive delta components, may be created to protect a base component when the first node, upon which the base component is located, goes into a maintenance mode. The two double delta components are placed on the second and third nodes respectively, and each of the second and third nodes includes a separate sibling component of the data object. A failure of the second node could take down the sibling component and delta component located thereon during the maintenance of the first node, which may cause the object to lose liveness. However, when the first node comes out of maintenance, the base component may be synchronized with the delta component on the third node. Once synchronized, the base component may be combined with the sibling components on the third and fourth nodes to restore liveness to the data object, despite the failure of the second node and the sibling component and delta component thereon.

In some examples, placing multiple delta components is more expensive than placing a single delta component since it increases the amount of replication that must occur during the lives of the delta components, including an increase of the I/O used and the storage space used by the delta components. If a single delta component cannot be placed as described above with respect to diagram 400A and the maintenance associated with the fault domain 442 of the base component 410 would reduce the number of fault domain failures the system is capable of handling (e.g., the hardware fault tolerance (HFT) or the FTT) to zero, then the double delta components (or more delta components) may be generated and placed with sibling data components as described herein. In such examples, if the HFT level of the system remains above zero after factoring in the base component fault domain 442 being unavailable for maintenance, then no delta components may be generated instead, as the HFT level of one or more may be considered sufficient. Loss of fault domains (e.g., due to maintenance modes or other reasons) may be tracked by the system, such that the tracked value may be used by the system when determining whether to create a single delta component, double delta components, or no delta components. For instance, in a RAID6 object with an HFT level of two, no delta component may be generated based on a first maintenance process of a node, but at least one delta component may be placed based on a second maintenance process of another node that occurs during the first maintenance process. Alternatively, or additionally, if the system requires a higher fault tolerance value, more than two delta components may be required to maintain sufficient fault tolerance.

In some examples, double delta components 414 and 415 are configured to operate in substantially the same manner as single delta components in that they are configured to track I/O write commands that are intended for the base component 410 while the base component 410 is unavailable. Further, in the event of failure of one double delta component, the failed double delta component may be cleaned up but the other double delta component may remain active and continue to behave as a delta component until it is also removed. Additionally, or alternatively, as a result of a point-fix or other operations generally, the entire delta subtree may be replaced such that both double delta components are removed.

In further examples, rebalancing or other similar processes being performed on a data object that includes double delta components or another quantity of nonexclusive delta components are required to use the same placement logic as described herein when rebalancing or otherwise moving a delta component (e.g., ensuring that a delta component is not co-located with the base component or another associated delta component).

Additionally, or alternatively, the system of diagram 400B may limit the creation of delta components based on resource usage. For instance, if the capacity or the component count of a data store are above 95% of the limits of the data store, no more delta components may be created until more of the resources of the data store become available again. Other limits may be placed on the creation of the delta components without departing from the description herein.

Figure 5A:
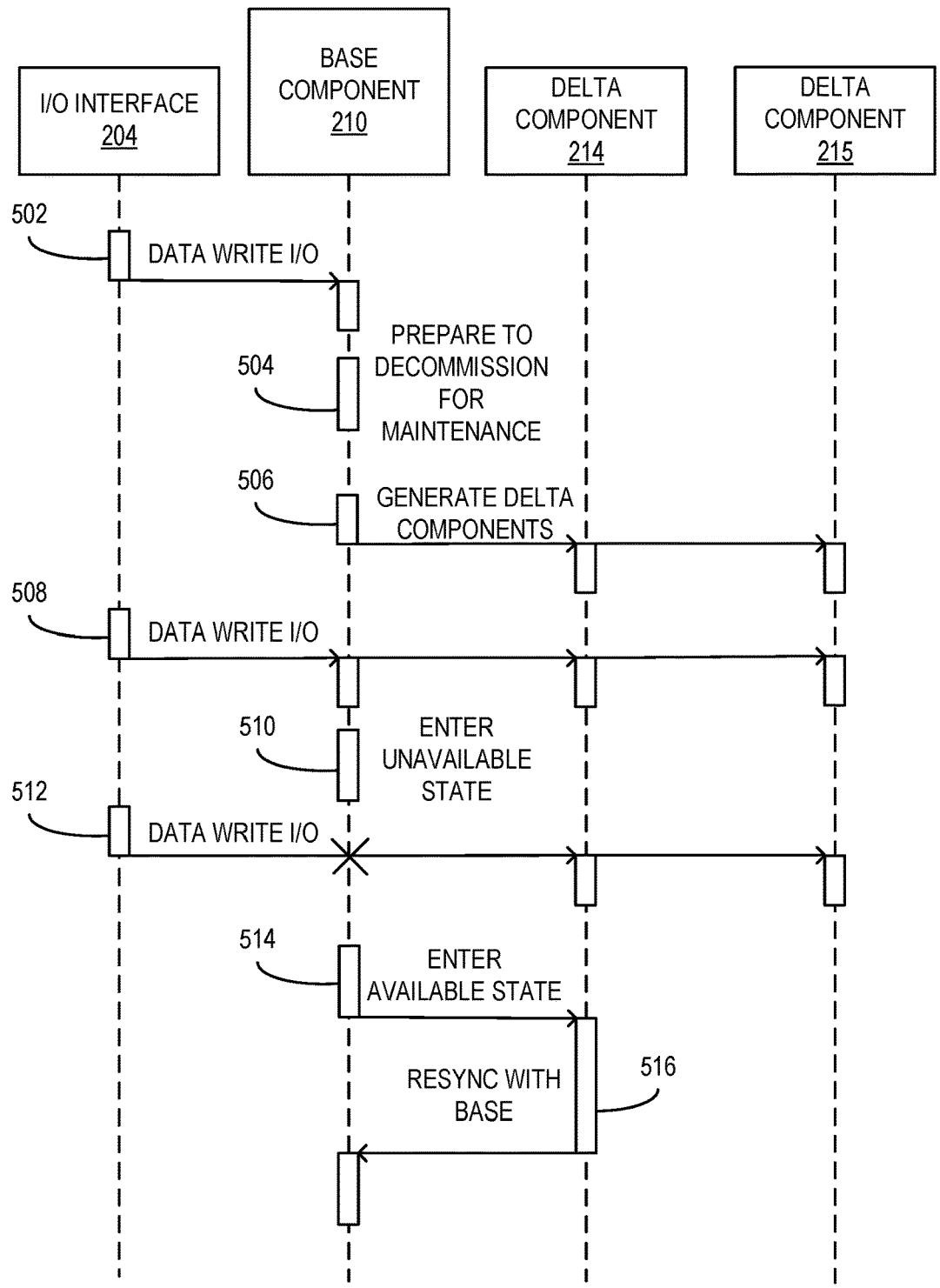
FIG. 5A is a sequence diagram illustrating a process of generating delta components, decommissioning an associated component, and synchronizing the associated component from one of the delta components according to an embodiment.

FIG. 5A is a sequence diagram illustrating a process 500A of generating delta components 214 and 215, decommissioning an associated component 210, and synchronizing the associated component 210 from one of the delta components 214 and 215 according to an embodiment. In some examples, the process 500A is performed by a component or components of a system such as system 200 of FIG. 2 as described herein. At 502, data write I/O is provided to the active base component 210 from the I/O interface 204. In some examples, the process 500 includes multiple data write I/O messages to the base component 210 prior to the process 500 proceeding to 504.

At 504, the base component 210 prepares to enter a decommissioned state or otherwise an unavailable state for maintenance. For instance, if a host device upon which the base component 210 is disposed is going to transition into a maintenance mode, the system schedules the base component 210 to enter a decommissioned or unavailable state during the maintenance of the host device. Additionally, or alternatively, the base component 210 may prepare to enter the unavailable state for other reasons without departing from the description.

As part of preparing to enter the unavailable state, delta components 214 and 215 are generated by or in association with the base component 210 at 506. In some examples, generating the delta components 214 and 215 include generating tracking bitmaps with which the delta components 214 and 215 are configured to track changes to the data address space due to data write I/O during the downtime of the base component. The delta components 214 and 215 are configured to comprise unwritten data blocks and to mirror changes targeted at the base component 210 after their generation.

For instance, at 508, prior to the base component 210 becoming decommissioned or unavailable but after the generation of the delta component 214, new data write I/O is provided to the base component 210. Because the delta components 214 and 215 are configured to mirror the base component 210 (e.g., via a RAID arrangement configured for mirroring), the data write I/O at 508 is also provided to the delta components 214 and 215. When the delta components 214 and 215 receive data write I/O, they track the changes made by the I/O using tracking bitmaps as described herein, so the data write I/O at 508 may be tracked in the tracking bitmaps of the delta components 214 and 215, respectively, even though the base component 210 also receives the I/O prior to becoming unavailable.

At 510, the base component 210 enters an unavailable state (e.g., a decommissioned state based on an associated host device going into a maintenance mode). While the base component 210 is unavailable, data write I/O is sent from the I/O interface 204. Because the base component 210 is unavailable, it does not receive the data write I/O, but the delta components 214 and 215 do receive the data write I/O. Changes made to the address space are tracked in the tracking bitmaps of the delta components 214 and 215. In some examples, multiple data write I/O's may be provided via the I/O interface 204 and received by the delta components 214 and 215 while the base component 210 is unavailable, as described herein.

At 514, the base component 210 enters an available state. In some examples, the host device of the base component 210 comes back online from a maintenance mode, enabling the base component 210 to become available and begin receiving data write I/Os and storing data based thereon. Because some data write I/O has been received that was intended for the base component 210 while the base component 210 was unavailable, the base component 210 is considered "stale". As a result, it must be synchronized with an active mirror, which includes the delta components 214 and 215 in this case. In other examples, other mirrored components may also be available as synchronization sources for the base component 210, as described herein.

At 516, the delta component 214 synchronizes, or resyncs, with the base component 210 to bring the base component 210 up to date. In some examples, the synchronization process includes identifying data blocks with changes that have been tracked by the delta component 214 and copying changes to those data blocks to the equivalent data blocks of the base component 210 as described herein. Additionally, the delta component 214 may be chosen to synchronize with the base component 210 instead of delta component 215 based on a defined priority, order, or other organization reason without departing from the description herein. For instance, the delta component 214 may be prioritized based on a connection between the base component 210 and the delta component 214 being stronger, faster, or closer from a network distance perspective than a connection between the base component 210 and the delta component 215. Alternatively, or additionally, delta component 214 may be chosen over delta component 215 for synchronization by virtue of delta component 214 being first in a list or other organization of the available delta components (e.g., the base component 210 and/or associated system records identifiers of the delta components and delta component 214 is recorded first, before delta component 215). In other examples, delta component 214 may be chosen over delta component 215 for synchronization for other reasons without departing from the description (e.g., a delta component may be chosen based on it being on a disk which is currently less heavily loaded than disks of other delta components, two delta components may be associated with different kinds or qualities of disks and one of the delta components may be prioritized based on those differences).

Figure 5B:
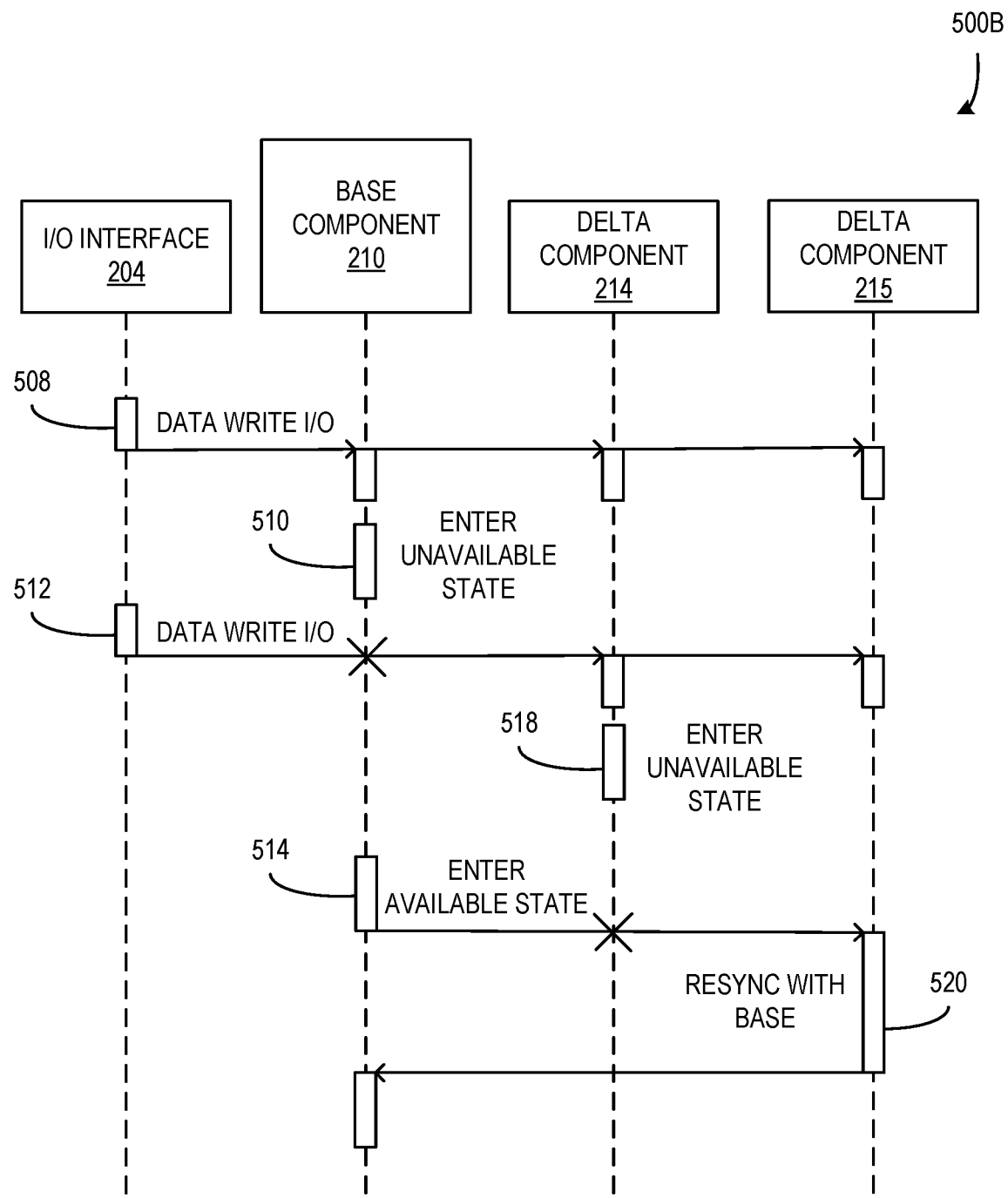
FIG. 5B is a sequence diagram illustrating a process of generating delta components, decommissioning an associated component, and synchronizing the associated component from one of the delta components based on another delta component being unavailable according to an embodiment.

FIG. 5B is a sequence diagram illustrating a process 500B of generating delta components 214 and 215, decommissioning an associated component 210, and synchronizing the associated base component 210 from one of the delta components 215 based on another delta component 214 being unavailable according to an embodiment. In some examples, the process 500B is performed by a component or components of a system such as system 200 of FIG. 2 as described herein. Further, the process 500B may be preceded by 502-506 of process 500A of FIG. 5A as described above. Additionally, 508, 510, and 512 may be performed as described above with respect to process 500 A of FIG. 5A.

During the writing of I/O to the delta components 214 and 215 during a time period when the base component 210 is unavailable, the delta component 214 becomes unavailable at 518. In some examples, the delta component 214 becomes unavailable as a result of a failure of the fault domain upon which the delta component 214 is stored. Alternatively, or additionally, the delta component 214 may become unavailable for other reasons without departing from the description herein.

At 514, the base component 210 enters an available state. It should be understood that the base component 210 may enter the available state in substantially the same manner as described above with respect to process 500A of FIG. 5A. As a result of entering the available state, a resync or synchronization is initiated with the delta component 215 based on the determining that the delta component 214 is unavailable.

At 520, the delta component 215 synchronizes, or resyncs, with the base component 210 to bring the base component 210 up to date. In some examples, the synchronization process includes identifying data blocks with changes that have been tracked by the delta component 215 and copying changes to those data blocks to the equivalent data blocks of the base component 210 as described herein.

Figure 5C:
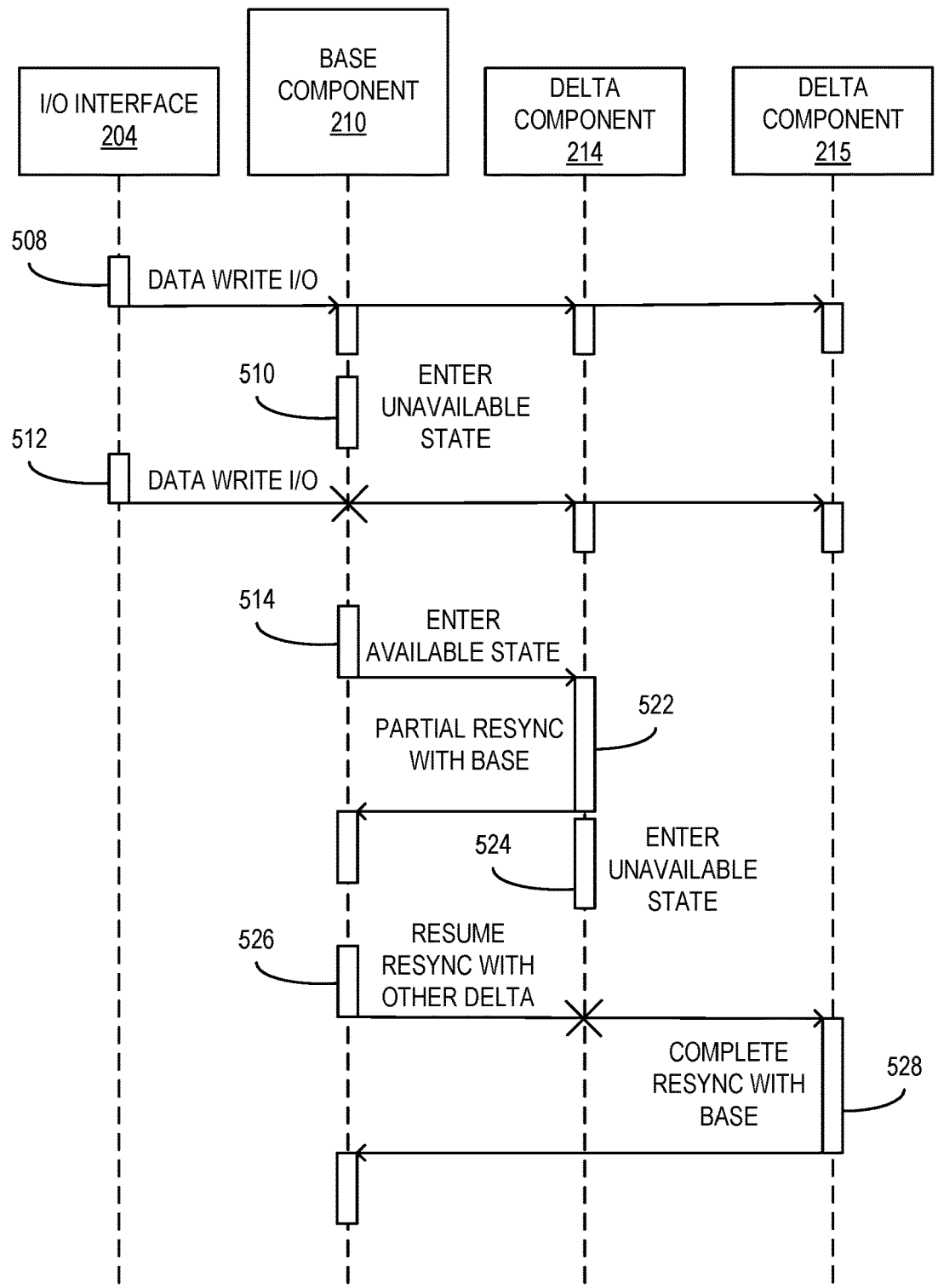
FIG. 5C is a sequence diagram illustrating a process of generating delta components, decommissioning an associated component, and synchronizing the associated component from two different delta components according to an embodiment.

FIG. 5C is a sequence diagram illustrating a process 500C of generating delta components 214 and 215, decommissioning an associated component 210, and synchronizing the associated component 210 from two different delta components 214 and 215 according to an embodiment. In some examples, the process 500C is performed by a component or components of a system such as system 200 of FIG. 2 as described herein. Further, the process 500C may be preceded by 502-506 of process 500A of FIG. 5A as described above. Additionally, 508, 510, and 512 may be performed as described above with respect to process 500 A of FIG. 5A.

At 514, the base component 210 enters an available state. In some examples, the host device of the base component 210 comes back online from a maintenance mode, enabling the base component 210 to become available and begin receiving data write I/Os and storing data based thereon. Because some data write I/O has been received that was intended for the base component 210 while the base component 210 was unavailable, the base component 210 is considered "stale". As a result, it must be synchronized with an active mirror, which includes the delta components 214 and 215 in this case. In other examples, other mirrored components may also be available as synchronization sources for the base component 210, as described herein.

At 522, the delta component 214 partially synchronizes, or resyncs, with the base component 210 to bring the base component 210 partially up to date. In some examples, the synchronization process includes identifying data blocks with changes that have been tracked by the delta component 214 and copying changes to those data blocks to the equivalent data blocks of the base component 210 as described herein. At 524, during the partial resync at 522, the resync process is interrupted by the delta component 214 unexpectedly entering an unavailable state. As described above, a delta component may enter an unavailable state based on a failure of an associated fault domain or for other reasons without departing from the description.

At 526, based on the resync only being partially completed, the base component 210 resumes the partial resync process using the delta component 215. At 528, the delta component 215 completes the resync process with the base component 210 such that the base component 210 is brought fully up to date. In some examples, the resuming and completing of the resync process includes identifying a subset of data of the delta component 215 that has not been synchronized with the base component 210 and resyncing that identified subset of data with the base component 210. For example, the base component 210 and/or associated resync process may track data blocks that have been synchronized from the delta component 214 previously and then synchronize only those data blocks that have not yet been synchronized based on the tracking bitmaps of the delta components. Alternatively, resuming and completing the resync process at 526 and 528 includes restarting the process from the beginning to fully synchronize the base component 210 with the delta component 215.

Figure 6:
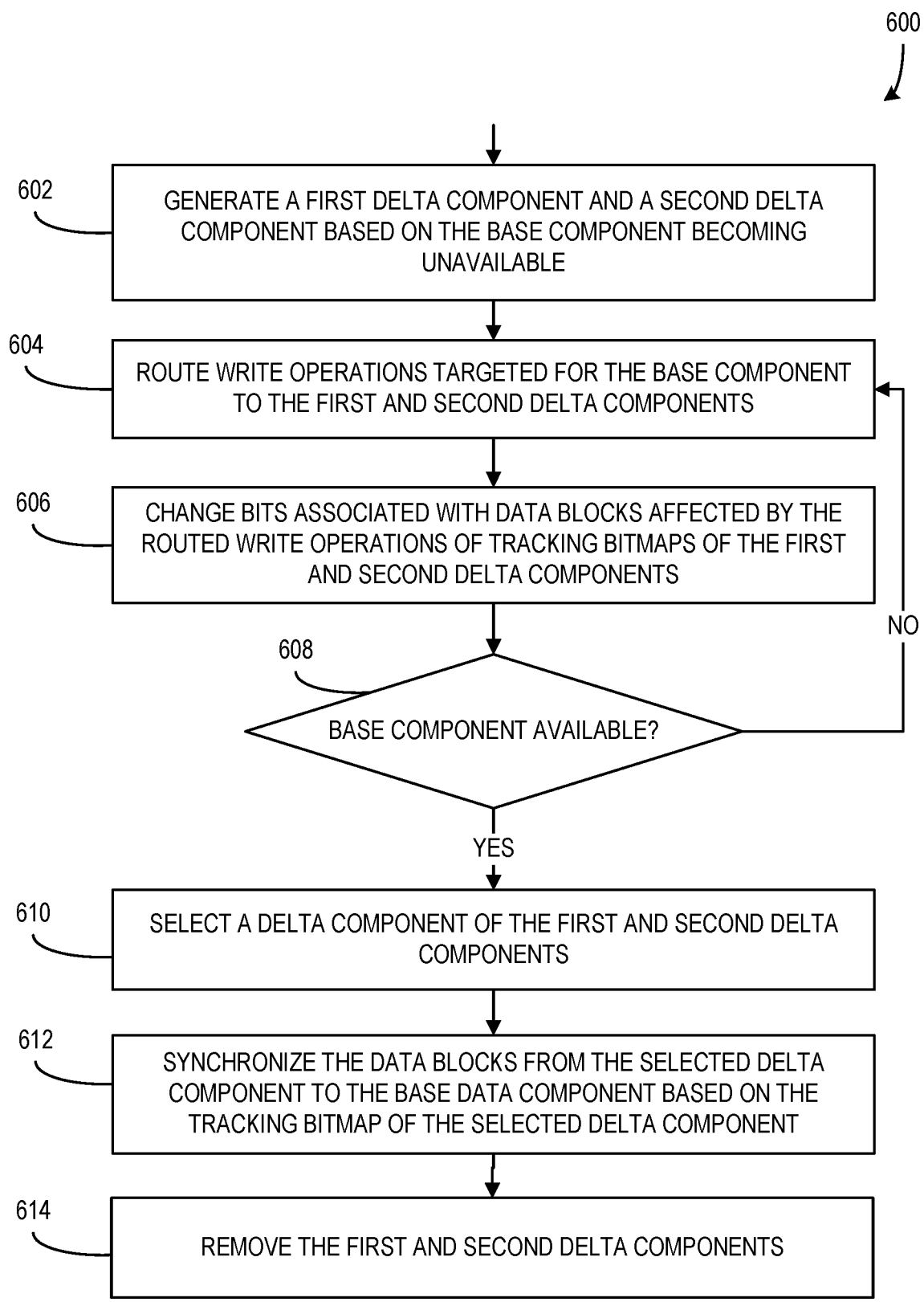
FIG. 6 is a flowchart illustrating a process of generating delta components associated with a base component, tracking write operations using the delta components while the base component is unavailable, and synchronizing the base component using the at least one of the delta components according to an embodiment.

FIG. 6 is a flowchart illustrating a process 600 of generating delta components (e.g., delta components 214 and 215)

associated with a base component (e.g., base component 210), tracking write operations using the delta components while the base component is unavailable, and synchronizing the base component using the at least one of the delta components according to an embodiment. In some examples, the process 600 is performed or otherwise implemented by a component or components of a system such as system 200 of FIG. 2. Further, the process 600 may be performed with respect to data components in a RAID configuration (e.g., components arranged in RAID 0 levels, RAID 1 levels, RAID 5 levels, or RAID 6 levels). At 602, a first delta component and a second delta component are generated based on the base component becoming unavailable. In some examples, the generation of the delta components is triggered by or otherwise based on a notification that the base component is going to become unavailable in the future (e.g., if a host device associated with the base component is going into a maintenance mode for a period of time). Further, in some examples, the generation of the delta components includes generating more than two delta components based on the requirements and/or limitations of the associated distributed data object (e.g., distributed data object 206) or storage network (e.g., storage network 202). Further, the first delta component may be generated on a first fault domain and the second delta component may be generated on a second fault domain, such that they are located on separate fault domains, as described above at least with respect to FIG. 4B.

At 604, write operations targeted for the base component are routed to the first and second delta components. In some examples, the write operations are mirrored, such that they are routed to both the base component and the delta components in the event that there is overlap in activity between the generation of the delta components and the moment when the base component becomes unavailable. Further, the write operations may be performed on data blocks of the delta components to make changes to data in those data blocks as described herein.

At 606, the bits of the tracking bitmaps of the delta components associated with data blocks affected by the routed write operations are changed. In some examples, each of the delta components includes a tracking bitmap as described herein and maintains it based on write operations received by the delta components.

At 608, if the base component is available, the process proceeds to 610. Alternatively, if the base component is still not available, the process returns to 604 to continue routing write operations to the delta component and updating the tracking bitmap accordingly. Detection of the availability of the base component may include periodically checking the availability status of the base component by another application, module, or component of the system. Alternatively, or additionally, when the base component becomes available again, it may be configured to provide a notification to other portions of the system.

At 610, a delta component of the first and second delta components is selected for use in synchronization. The selection of the delta component may be based on a defined order, priority, or other organization of the first and second delta components (e.g., the first delta component may be located first on a list or structure that identifies the available delta components, resulting in the first delta component being selected first). Alternatively, or additionally, the delta component may be selected based on the availability (e.g., one of the delta components may have failed or otherwise become unavailable) and/or performance data of each delta component (e.g., the speed and/or reliability of data transfer to and/or from each delta component). In some examples, when the base component becomes available, the first and second delta components are first identified and/or designated as the synchronization source from a set of possible synchronization sources (e.g., other mirrored components). In such examples, the system identifies a set of possible synchronization sources including the first and second delta components and selects one of the delta components as a designated synchronization source from the set of possible synchronization sources based on a defined prioritization of available delta components (e.g., delta components are preferred over conventional mirrored components if they are available).

At 612, the base component is now available and needs to be synchronized with the selected delta component to bring it up to date. The data blocks identified in the tracking bitmap of the selected delta component are synchronized from the selected delta component to the base component. In some examples, synchronizing includes copying the identified data blocks from the selected delta component to the base component. The synchronization process is described in greater detail at least with respect to FIG. 4A. In some examples, the tracking bitmap includes bits that refer to specific data blocks in the address space of the base component (e.g., 1 bit representing a 256 KB block of a 256 GB data component address space). If any portion of a data block has been changed, the tracking bit associated with the data block is set to indicate that a change occurred, and that data block is then identified for synchronization.

At 614, after the base component is brought up to date and is no longer stale due to synchronizing from the selected delta component, the delta components are removed. In some examples, removal of the delta components includes marking the delta components for removal and/or notifying a cleanup process of the system to delete or otherwise remove the delta components and free up the resources associated therewith.

Figure 7:
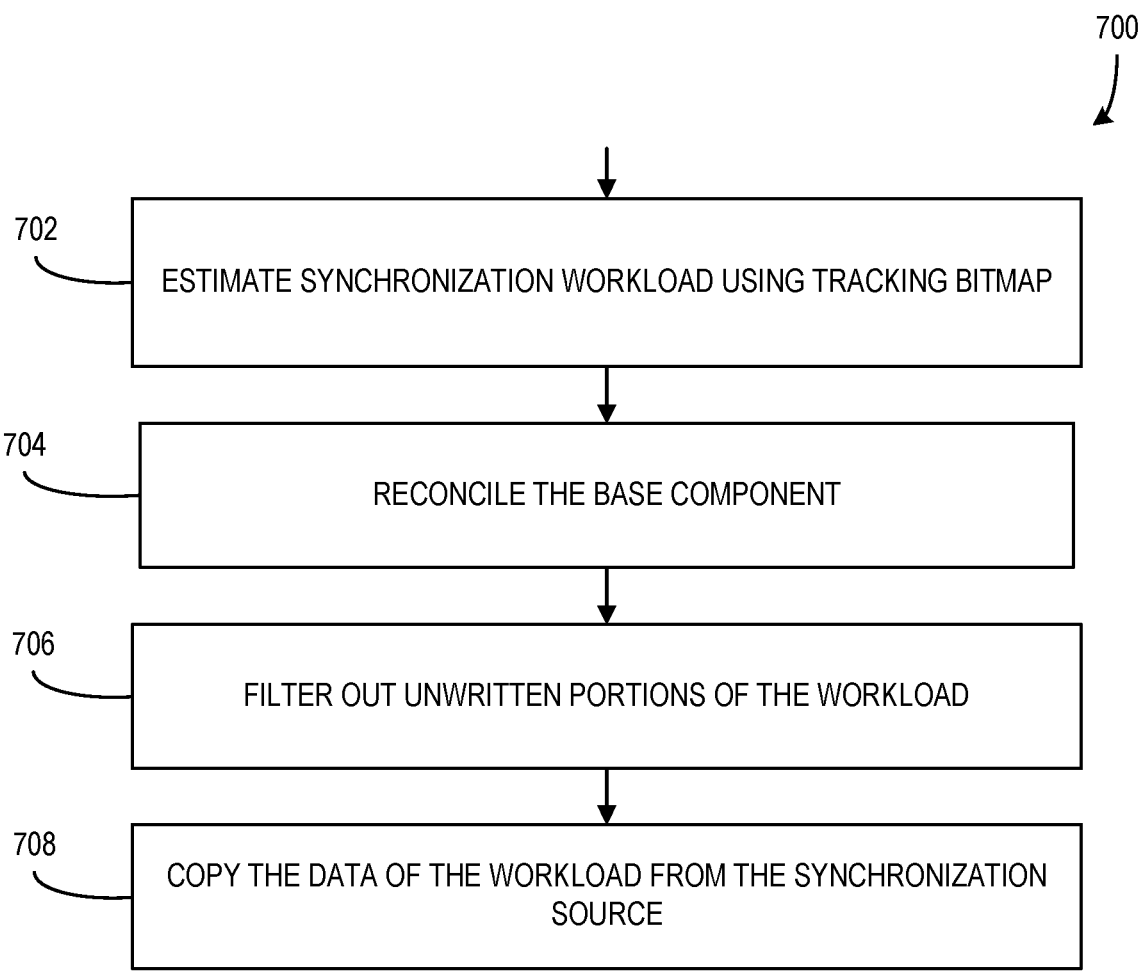
FIG. 7 is a flowchart illustrating a process of performing a synchronization operation from a delta component to an associated base component according to an embodiment.

FIG. 7 is a flowchart illustrating a process 700 of performing a synchronization operation from a delta component (e.g., delta component 214) to an associated base component (e.g., base component 210) according to an embodiment. In some examples, the process 700 is performed or otherwise implemented by a component or components of a system such as system 200 of FIG. 2. Further, the process 700 may be performed as a part of the process 600 described above (e.g., the synchronization process 700 may be performed during and/or between 610 and 612 of the process 600). At 702, a synchronization workload is estimated using the tracking bitmap of the delta component. In some examples, estimating the synchronization workload includes identifying the data blocks of the delta component that have been changed based on the tracking bitmap and multiply the number of identified data blocks by the size of each data block. This provides a maximum quantity of memory that may need to be copied during the synchronization process.

At 704, the base component is reconciled. In some examples, reconciling the base component includes reconciling prepared writes of the base component by determining whether to commit them or abort them prior to synchronization.

At 706, the unwritten portions of the workload are filtered out of the workload. In some examples, this step is only performed if the synchronization source is confirmed to be a delta component. Because the delta component is initialized with unwritten data locations and only writes to the data locations largely during the downtime of the base component, much of the data that is initially included in the synchronization workload may be filtered out, as described herein. Thus, only the data locations affected by the routed write operations to the delta component are used as part of the workload after the filtering.

At 708, the data of the workload is copied from the synchronization source to the base component. As described herein, the delta component is prioritized as the synchronization source. In examples where the delta component is the synchronization source, the workload data being copied may be limited to only the data that was changed during the downtime of the base component. Alternatively, if the synchronization source is not the delta component, the filtering of unwritten portions may not have been possible and the copying of the workload data may include copying entire data blocks that include changed data locations from the synchronization source to the base component.

Additional Example Scenarios

Aspects of the disclosure enable various additional scenarios, such as next described.

In an example, a distributed data object includes a first data component and a second data component. The two components are configured to be mirrored, such that they both store the same data to enhance the data durability and data availability of the distributed data object.

During operation of the system, it is determined that a host device of the first component needs to be switched to a maintenance mode and updated, during which the first component will become unavailable. Before the first component is transitioned to an unavailable state, the system generates two delta components associated with the first component. The delta components are configured to mirror I/O traffic to the first component after its generation. The delta components are generated with unwritten data blocks of the address space of the first component.

After generation of the delta components is complete, the first component is transitioned to an unavailable state and the host device associated with the first component enters a maintenance mode for a period. During the period, the delta components each receive copies of I/O traffic targeted at the first component and record the associated data changes in the unwritten data blocks. Further, the delta components indicate the data blocks that are changed in a tracking bitmap as described herein.

After the maintenance on the host device is complete, the first component becomes available again but is in a stale state due to having missed some I/O traffic while unavailable. The system identifies that the delta components are available and selects one of the two delta components for synchronization based on a defined order of the two delta components, such that the first available delta component of the defined order is selected. The system performs a synchronization process from the selected delta component to the first component. The synchronization process includes identifying data blocks that have been changed by the I/O traffic using the tracking bitmap of the selected delta component to form a synchronization workload, filtering out the unwritten data locations of the data blocks in the synchronization workload, and copying the remaining data locations of the synchronization workload from the selected delta component to the first component. After the synchronization process is complete, the first component is up-to-date, and the delta components are marked for removal by a cleanup process of the system.

In a related example, during the downtime of the first component, a second component that is a mirror component of the first component unexpectedly fails. Based on the detection of this failure, the system causes the delta components to begin second tracking bitmaps that track changes that occur from I/O traffic starting at the time the second component became unavailable.

After the first component is brought back up to date via the synchronization process, the second tracking bitmap is provided to the first component before the delta component is removed, such that the first component is configured to continue tracking data changes that the second component has missed. When the second component is brought back online, the first component may be used, along with the tracking bitmap received from the delta component, to synchronize with the second component and bring it up to date as well.

In another example, the selected delta component fails during the synchronization of the stale first component. The synchronization process includes tracking data blocks of the delta component that have been synchronized to the stale first component, so the system selects the other delta component that was previously not selected and resumes the synchronization process using the newly selected delta component. The synchronization process resumes by identifying the subset of data blocks that are indicated as needing to be synchronized in the tracking bitmap of the newly selected delta component and that have not already been synchronized previously based on the tracked progress of the first portion of the synchronization process. The synchronization process is then completed using the newly selected delta component, whereby the first component is brought back up to date despite the sudden failure of the first selected delta component during synchronization.

Exemplary Operating Environment

Figure 8:
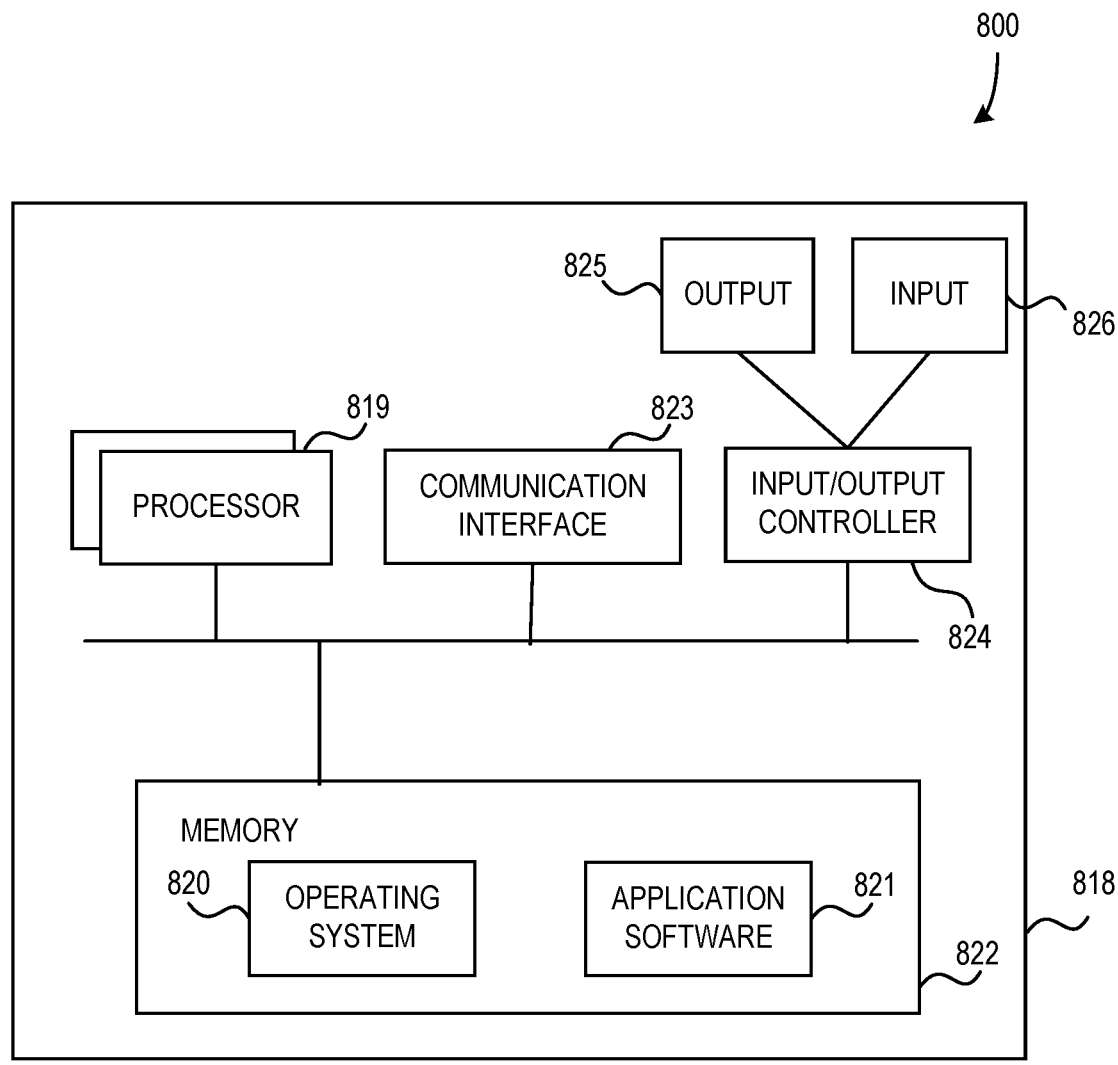
FIG. 8 illustrates a computing apparatus according to an embodiment as a functional block diagram.

The present disclosure is operable with a computing apparatus according to an embodiment as a functional block diagram 800 in FIG. 8. In an embodiment, components of a computing apparatus 818 may be implemented as a part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hard-coded machine. Platform software comprising an operating system 820 or any other suitable platform software may be provided on the apparatus 818 to enable application software 821 to be executed on the device. According to an embodiment, generating multiple delta components for a base component, tracking I/O traffic with the delta components, and synchronizing the base component from the delta components as described herein may be accomplished by software, hardware, and/or firmware.

Computer executable instructions may be provided using any computer-readable media that are accessible by the computing apparatus 818. Computer-readable media may include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g. using a communication interface 823).

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone, or a touchpad. In one embodiment, the output device 825 may also act as the input device. An example of such a device may be a touch sensitive display. The input/output controller 824 may also output data to devices other than the output device, e.g. a locally connected printing device. In some embodiments, a user may provide input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system for enhancing data durability of a base component using multiple delta components comprises: a processor; and a non-transitory computer readable medium having stored thereon program code for transferring data to another computer system, the program code causing the processor to: generate a first delta component on a first fault domain and a second delta component on a second fault domain based on the base component becoming unavailable, wherein each of the first delta component and the second delta component is configured to have an address space matching an address space of the base component and a tracking bitmap including a plurality of bits associated with data blocks of the address space of the delta component; route a write operation targeted for the base component to the first delta component and to the second delta component; based on routing the write operation targeted for the base component to the first delta component and to the second delta component, change a bit associated with a data block affected by the routed write operation in the tracking bitmap of the first delta component and changing a bit associated with the data block affected by the routed write operation in the tracking bitmap of the second delta component; based on detecting the base component becoming available, select one delta component of the first delta component and the second delta component for synchronization; synchronize, using the tracking bitmap of the selected delta component, the data block affected by the routed write operation from the selected delta component to the base component; and remove the first delta component and the second delta component.

An example method for enhancing data durability of a base component using multiple delta components comprises: generating, by a processor, a first delta component on a first fault domain and a second delta component on a second fault domain based on the base component becoming unavailable, wherein each of the first delta component and the second delta component is configured to include unwritten storage space with an address space matching an address space of the base component and a tracking bitmap including a plurality of bits associated with data blocks of the address space of the delta component; routing, by the processor, a write operation targeted for the base component to the first delta component and to the second delta component; based on routing the write operation targeted for the base component to the first delta component and to the second delta component, changing, by the processor, a bit associated with a data block affected by the routed write operation in the tracking bitmap of the first delta component and changing a bit associated with the data block affected by the routed write operation in the tracking bitmap of the second delta component; based on detecting the base component becoming available, selecting, by the processor, one delta component of the first delta component and the second delta component for synchronization; synchronizing, by the processor, using the tracking bitmap of the selected delta component, the data block affected by the routed write operation from the selected delta component to the base component; and removing, by the processor, the first delta component and the second delta component.

An example non-transitory computer storage medium has stored thereon program code executable by a first computer system at a first site, the program code embodies a method that comprises: generating a first delta component on a first fault domain and a second delta component on a second fault domain based on the base component becoming unavailable, wherein each of the first delta component and the second delta component is configured to include unwritten storage space with an address space matching an address space of the base component and a tracking bitmap including a plurality of bits associated with data blocks of the address space of the delta component; routing a write operation targeted for the base component to the first delta component and to the second delta component; based on routing the write operation targeted for the base component to the first delta component and to the second delta component, changing a bit associated with a data block affected by the routed write operation in the tracking bitmap of the first delta component and changing a bit associated with the data block affected by the routed write operation in the tracking bitmap of the second delta component; based on detecting the base component becoming available, selecting one delta component of the first delta component and the second delta component for synchronization; synchronizing, using the tracking bitmap of the selected delta component, the data block affected by the routed write operation from the selected delta component to the base component; and removing the first delta component and the second delta component.

Alternatively, or in addition to the other examples described herein, examples include any combination of the following:
  wherein synchronizing the data block affected by the routed write operation from the selected delta component to the base component includes: identifying a subset of data locations in the affected data block to which data has been written in the selected delta component; and writing the identified subset of data locations to which data has been written from the selected delta component to the base component.
  wherein generating the first delta component and the second delta component is based on receiving a notification prior to the base component becoming unavailable; and wherein the first delta component and the second delta component are generated prior to the base component becoming unavailable.
  further comprising: identifying, by the processor, a set of synchronization sources based on detecting the base component becoming available, wherein the set of synchronization sources includes the first delta component, the second delta component, and at least one mirrored component associated with the base component; and selecting, by the processor, one delta component of the first delta component and the second delta component as a synchronization source for the base component based on a defined prioritization of available delta components.
  wherein selecting one delta component of the first delta component and the second delta component includes selecting the first delta component; and the method further comprising: detecting, by the processor, that the first delta component is unavailable and that synchronizing the data block affected by the routed write operation from the selected delta component to the base component is incomplete; based on detecting that the synchronizing is incomplete, selecting, by the processor, the second delta component; and synchronizing, by the processor, using the tracking bitmap of the selected second delta component, the data block affected by the routed write operation from the selected second delta component to the base component.
  wherein changing the bit associated with the data block affected by the routed write operation in the tracking bitmap further includes updating allocation metadata of the data block, the updated allocation metadata indicating granular data regions within the data block that are affected by the routed write operation; and wherein synchronizing, using the tracking bitmap of the selected delta component, the data block affected by the routed write operation from the selected delta component to the base component further includes identifying the granular data regions within the data block for synchronization based on the allocation metadata of the data block.
  wherein routing the write operation targeted for the base component to the first delta component and the second delta component includes: collecting votes from components on whether to commit the write operation based on a two-phase commit protocol, wherein the first delta component and the second delta component have equal voting weight to other components to which the write operation is targeted; and based on a quantity of the collected votes meeting a threshold quantity, committing the write operation to the first delta component and the second delta component.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for generating, by a processor, a first delta component on a first fault domain and a second delta component on a second fault domain based on the base component becoming unavailable, wherein each of the first delta component and the second delta component is configured to include unwritten storage space with an address space matching an address space of the base component and a tracking bitmap including a plurality of bits associated with data blocks of the address space of the delta component; exemplary means for routing, by the processor, a write operation targeted for the base component to the first delta component and to the second delta component; based on routing the write operation targeted for the base component to the first delta component and to the second delta component, exemplary means for changing, by the processor, a bit associated with a data block affected by the routed write operation in the tracking bitmap of the first delta component and changing a bit associated with the data block affected by the routed write operation in the tracking bitmap of the second delta component; based on detecting the base component becoming available, exemplary means for selecting, by the processor, one delta component of the first delta component and the second delta component for synchronization; exemplary means for synchronizing, by the processor, using the tracking bitmap of the selected delta component, the data block affected by the routed write operation from the selected delta component to the base component; and exemplary means for removing, by the processor, the first delta component and the second delta component.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for enhancing data durability of a base component using multiple delta components, the method comprising:

generating, by a processor, a first delta component on a first fault domain and a second delta component on a second fault domain based on the base component becoming unavailable, wherein each of the first delta component and the second delta component is configured to include (a) unwritten storage space with an address space matching an address space of the base component and (b) a tracking bitmap including a plurality of bits associated with data blocks of the address space of the delta component;

routing, by the processor, a write operation targeted for the base component to the first delta component and to the second delta component;

based on routing the write operation targeted for the base component to the first delta component and to the second delta component, changing, by the processor, a bit associated with a data block affected by the routed write operation in the tracking bitmap of the first delta component and changing a bit associated with the data block affected by the routed write operation in the tracking bitmap of the second delta component;

based on detecting the base component becoming available, selecting, by the processor, one delta component of the first delta component and the second delta component for synchronization;

synchronizing, by the processor, using the tracking bitmap of the selected delta component, the data block affected by the routed write operation from the selected delta component to the base component; and removing, by the processor, the first delta component and the second delta component.

2. The method of claim 1, wherein synchronizing the data block affected by the routed write operation from the selected delta component to the base component includes:

identifying a subset of data locations in the affected data block to which data has been written in the selected delta component; and writing the identified subset of data locations to which data has been written from the selected delta component to the base component.

3. The method of claim 1, wherein generating the first delta component and the second delta component is based on receiving a notification prior to the base component becoming unavailable, and wherein the first delta component and the second delta component are generated prior to the base component becoming unavailable.

4. The method of claim 1, further comprising:
identifying, by the processor, a set of synchronization sources based on detecting the base component becoming available, wherein the set of synchronization sources includes the first delta component, the second delta component, and at least one mirrored component associated with the base component; and
selecting, by the processor, one delta component of the first delta component and the second delta component as a synchronization source for the base component based on a defined prioritization of available delta components.

5. The method of claim 1, wherein selecting one delta component of the first delta component and the second delta component includes selecting the first delta component, and the method further comprising:
detecting, by the processor, that the first delta component is unavailable and that synchronizing the data block affected by the routed write operation from the selected delta component to the base component is incomplete;
based on detecting that the synchronizing is incomplete, selecting, by the processor, the second delta component; and
synchronizing, by the processor, using the tracking bitmap of the selected second delta component, the data block affected by the routed write operation from the selected second delta component to the base component.

6. The method of claim 1, wherein changing the bit associated with the data block affected by the routed write operation in the tracking bitmap further includes updating allocation metadata of the data block, the updated allocation metadata indicating granular data regions within the data block that are affected by the routed write operation; and
wherein synchronizing, using the tracking bitmap of the selected delta component, the data block affected by the routed write operation from the selected delta component to the base component further includes identifying the granular data regions within the data block for synchronization based on the allocation metadata of the data block.

7. The method of claim 1, wherein routing the write operation targeted for the base component to the first delta component and the second delta component includes:
collecting votes from components on whether to commit the write operation based on a two-phase commit protocol, wherein the first delta component and the second delta component have equal voting weight to other components to which the write operation is targeted; and
based on a quantity of the collected votes meeting a threshold quantity, committing the write operation to the first delta component and the second delta component.

8. A computer system for enhancing data durability of a base component using multiple delta components, the computer system comprising:
a processor; and
a non-transitory computer readable medium having stored thereon program code for transferring data to another computer system, the program code causing the processor to:
generate a first delta component on a first fault domain and a second delta component on a second fault domain based on the base component becoming unavailable, wherein each of the first delta component and the second delta component is configured to have (a) an address space matching an address space of the base component and (b) a tracking bitmap including a plurality of bits associated with data blocks of the address space of the delta component;
route a write operation targeted for the base component to the first delta component and to the second delta component;
based on routing the write operation targeted for the base component to the first delta component and to the second delta component, change a bit associated with a data block affected by the routed write operation in the tracking bitmap of the first delta component and changing a bit associated with the data block affected by the routed write operation in the tracking bitmap of the second delta component;
based on detecting the base component becoming available, select one delta component of the first delta component and the second delta component for synchronization;
synchronize, using the tracking bitmap of the selected delta component, the data block affected by the routed write operation from the selected delta component to the base component; and
remove the first delta component and the second delta component.

9. The computer system of claim 8, wherein synchronizing the data block affected by the routed write operation from the selected delta component to the base component includes:
identifying a subset of data locations in the affected data block to which data has been written in the selected delta component; and
writing the identified subset of data locations to which data has been written from the selected delta component to the base component.

10. The computer system of claim 8, wherein generating the first delta component and the second delta component is based on receiving a notification prior to the base component becoming unavailable, and wherein the first delta component and the second delta component are generated prior to the base component becoming unavailable.

11. The computer system of claim 8, wherein the program code is further operative to:
identify a set of synchronization sources based on detecting the base component becoming available, wherein the set of synchronization sources includes the first delta component, the second delta component, and at least one mirrored component associated with the base component; and
select one delta component of the first delta component and the second delta component as a synchronization source for the base component based on a defined prioritization of available delta components.

12. The computer system of claim 8, wherein selecting one delta component of the first delta component and the second delta component includes selecting the first delta component, and wherein the program code is further operative to:
detect that the first delta component is unavailable and that synchronizing the data block affected by the routed write operation from the selected delta component to the base component is incomplete;
based on detecting that the synchronizing is incomplete, select the second delta component; and
synchronize using the tracking bitmap of the selected second delta component, the data block affected by the routed write operation from the selected second delta component to the base component.

13. The computer system of claim 8, wherein changing the bit associated with the data block affected by the routed write operation in the tracking bitmap further includes updating allocation metadata of the data block, the updated allocation metadata indicating granular data regions within the data block that are affected by the routed write operation; and wherein synchronizing, using the tracking bitmap of the selected delta component, the data block affected by the routed write operation from the selected delta component to the base component further includes identifying the granular data regions within the data block for synchronization based on the allocation metadata of the data block.

14. The computer system of claim 8, wherein routing the write operation targeted for the base component to the first delta component and the second delta component includes:

collecting votes from components on whether to commit the write operation based on a two-phase commit protocol, wherein the first delta component and the second delta component have equal voting weight to other components to which the write operation is targeted; and based on a quantity of the collected votes meeting a threshold quantity, committing the write operation to the first delta component and the second delta component.

15. A non-transitory computer storage medium having stored thereon program code executable by a first computer system at a first site, the program code embodying a method comprising:

generating a first delta component on a first fault domain and a second delta component on a second fault domain based on the base component becoming unavailable, wherein each of the first delta component and the second delta component is configured to include (a) unwritten storage space with an address space matching an address space of the base component and (b) a tracking bitmap including a plurality of bits associated with data blocks of the address space of the delta component;

routing a write operation targeted for the base component to the first delta component and to the second delta component;

based on routing the write operation targeted for the base component to the first delta component and to the second delta component, changing a bit associated with a data block affected by the routed write operation in the tracking bitmap of the first delta component and changing a bit associated with the data block affected by the routed write operation in the tracking bitmap of the second delta component;

based on detecting the base component becoming available, selecting one delta component of the first delta component and the second delta component for synchronization;

synchronizing, using the tracking bitmap of the selected delta component, the data block affected by the routed write operation from the selected delta component to the base component; and removing the first delta component and the second delta component.

16. The non-transitory computer storage medium of claim 15, wherein synchronizing the data block affected by the routed write operation from the selected delta component to the base component includes:

identifying a subset of data locations in the affected data block to which data has been written in the selected delta component; and writing the identified subset of data locations to which data has been written from the selected delta component to the base component.

17. The non-transitory computer storage medium of claim 15, wherein generating the first delta component and the second delta component is based on receiving a notification prior to the base component becoming unavailable, and wherein the first delta component and the second delta component are generated prior to the base component becoming unavailable.

18. The non-transitory computer storage medium of claim 15, wherein the program code further comprises:

identifying a set of synchronization sources based on detecting the base component becoming available, wherein the set of synchronization sources includes the first delta component, the second delta component, and at least one mirrored component associated with the base component; and selecting one delta component of the first delta component and the second delta component as a synchronization source for the base component based on a defined prioritization of available delta components.

19. The non-transitory computer storage medium of claim 15, wherein selecting one delta component of the first delta component and the second delta component includes selecting the first delta component, and wherein the program code further comprises:

detecting that the first delta component is unavailable and that synchronizing the data block affected by the routed write operation from the selected delta component to the base component is incomplete;

based on detecting that the synchronizing is incomplete, selecting the second delta component; and synchronizing using the tracking bitmap of the selected second delta component, the data block affected by the routed write operation from the selected second delta component to the base component.

20. The non-transitory computer storage medium of claim 15, wherein changing the bit associated with the data block affected by the routed write operation in the tracking bitmap further includes updating allocation metadata of the data block, the updated allocation metadata indicating granular data regions within the data block that are affected by the routed write operation; and wherein synchronizing, using the tracking bitmap of the selected delta component, the data block affected by the routed write operation from the selected delta component to the base component further includes identifying the granular data regions within the data block for synchronization based on the allocation metadata of the data block.

* * * * *